US011301314B2

(12) United States Patent
Basu et al.

(10) Patent No.: US 11,301,314 B2
(45) Date of Patent: Apr. 12, 2022

(54) METHODS AND SYSTEMS FOR COLLABORATIVE EVIDENCE-BASED PROBLEM INVESTIGATION AND RESOLUTION

(71) Applicant: smartQED, Inc, San Mateo, CA (US)

(72) Inventors: Julie Basu, San Mateo, CA (US); Terry Gallagher, Lakewood, CO (US); Rishi Mukhopadhyay, Portland, OR (US); June Mukherjee, Portland, OR (US)

(73) Assignee: SMARTQED, INC., San Mateo, CA (US)

( * ) Notice: Subject to any disclaimer, the term of this patent is extended or adjusted under 35 U.S.C. 154(b) by 0 days.

(21) Appl. No.: 16/775,584

(22) Filed: Jan. 29, 2020

(65) Prior Publication Data

US 2020/0241949 A1 Jul. 30, 2020

Related U.S. Application Data

(60) Provisional application No. 62/798,441, filed on Jan. 29, 2019.

(51) Int. Cl.
*G06F 11/00* (2006.01)
*G06F 11/07* (2006.01)

(52) U.S. Cl.
CPC ........ *G06F 11/079* (2013.01); *G06F 11/0769* (2013.01); *G06F 11/0775* (2013.01); *G06F 11/0793* (2013.01)

(58) Field of Classification Search
CPC ............... G06F 11/079; G06F 11/0769; G06F 11/0775; G06F 11/0793
See application file for complete search history.

(56) References Cited

U.S. PATENT DOCUMENTS 6,721,713 B1 * 4/2004 Guheen .................. G06Q 50/01
705/1.1
7,516,025 B1 * 4/2009 Williams ........... G05B 23/0278
702/182

(Continued)

*Primary Examiner* — Jonathan D Gibson
(74) *Attorney, Agent, or Firm* — Kanika Radhakrishnan; Evergreen Valley Law Group

(57) ABSTRACT

Methods and systems for collaborative evidence-based problem investigation and resolution are described. The method includes receiving data related with fault that has occurred in faulty system. The data includes symptoms and details associated with each symptom. The method includes arranging data in symptoms table. The symptoms table includes rows for describing symptoms and columns for defining details associated with each symptom. The method includes facilitating concurrent update of symptoms table by users in order to indicate clues or update details, and causing provisioning of cause-effect UI to facilitate creation of cause-effect graph using clues. The method includes creating cause-tree/fishbone diagram based in part on at least one of: causes defined by users, symptoms and clues defined in symptoms table, components of faulty system, and historical data from prior problem investigations. The method further includes displaying cause-tree/fishbone diagram for facilitating determination of potential causes and solutions of new faults.

27 Claims, 21 Drawing Sheets

(56) References Cited

U.S. PATENT DOCUMENTS

| | | | |
|---|---|---|---|
| 7,590,513 B2* | 9/2009 | Jiang | G06F 11/008 |
| | | | 703/2 |
| 7,593,936 B2* | 9/2009 | Hooks | G06F 11/0793 |
| 8,850,263 B1* | 9/2014 | Yourtee | G06F 11/0709 |
| | | | 714/20 |
| 9,083,560 B2* | 7/2015 | Lee | G06Q 10/10 |
| 9,443,196 B1* | 9/2016 | Jain | G06Q 10/0633 |
| 10,409,664 B2* | 9/2019 | Malecki | G06F 11/0757 |
| 2005/0214731 A1* | 9/2005 | Smith | G09B 7/00 |
| | | | 434/322 |
| 2015/0199229 A1* | 7/2015 | Amendjian | G06F 11/0772 |
| | | | 714/57 |
| 2016/0085608 A1* | 3/2016 | Bovey | G05B 23/0278 |
| | | | 714/37 |
| 2017/0039105 A1* | 2/2017 | Shivanna | G06Q 10/20 |
| 2019/0034263 A1* | 1/2019 | Malecki | G06F 11/079 |
| 2019/0129781 A1* | 5/2019 | Uchiumi | G06F 11/0721 |
| 2019/0130294 A1* | 5/2019 | Volponi | G06N 5/048 |
| 2019/0227861 A1* | 7/2019 | Majumder | G06Q 30/016 |
| 2019/0324831 A1* | 10/2019 | Gu | G06F 11/0778 |
| 2019/0361760 A1* | 11/2019 | Krishnan | G06F 11/0769 |
| 2019/0377623 A1* | 12/2019 | Ramachandran | G06N 20/00 |
| 2020/0183772 A1* | 6/2020 | Bangalore | G06F 11/0793 |
| 2020/0241949 A1* | 7/2020 | Basu | G06F 11/079 |

* cited by examiner

| SYMPTOM IDENTIFIER 302 | SYMPTOM PATTERNS (WHAT) 304 | TIME OF EVENT OCCURRENCE (WHEN) 306 | COMPONENT (WHERE) 308 | SYMPTOM CATEGORY 310 | CLUE? 312 |
|---|---|---|---|---|---|
| A1 | DB CONNECTION FAILED | 2018-11-15 16:09:19 UTC, 2018-11-15 16:08:33 UTC, 2018-11-15 16:07:04 UTC | APPLICATION | ERROR | YES |
| A2 | SYSTEM ERROR : COULD NOT CREATE NEW PURCHASE ORDER | 2018-11-15 16:10:23 UTC | APPLICATION | ERROR | YES |
| A3 | CONTACT YOUR SUPPORT TEAM | 2018-11-15 16:11:01 UTC | APPLICATION | OTHER | NO |
| D1 | SQL ERROR 1028 - SORT ABORTED | 2018-11-15 16:06:52 UTC | DATABASE | ERROR | YES |
| D2 | SQL ERROR 1028 - OUT OF MEMORY | 2018-11-15 16:06:45 UTC | DATABASE | ERROR | YES |
| D3 | COLUMN 'A' CANNOT BE NULL | 2018-11-15 15:29:18 UTC | DATABASE | WARNING | NO |
| W1 | 500 INTERNAL SERVER ERROR | 2018-11-15 16:12:19 UTC | WEB | ERROR | YES |
| W2 | 404 FILE NOT FOUND | 2018-11-15 16:03:23 UTC, 2018-11-15 15:27:04 UTC | WEB | OTHER | NO |

| ATTRIBUTE 802 | TYPE 804 | DESCRIPTION 806 | EXAMPLE 808 |
|---|---|---|---|
| NAME | SINGLE-VALUED | LABEL FOR CAUSE, UNIQUE AMONG SIBLINGS BUT NOT NECESSARILY UNIQUE IN THE CAUSE TREE | 'CONFIGURATION ISSUE' |
| CATEGORY | SINGLE-VALUED | CLASSIFICATION OF THE CAUSE (USEFUL FOR SELF-LEARNING) | 'ENVIRONMENT' |
| DEADLINE | SINGLE-VALUED | A TIME DEADLINE FOR ANALYZING THE CAUSE | 2018-11-15 17:00:00 UTC |
| FAULT STATUS | SINGLE-VALUED | OUTCOME OF THE FAULT ANALYSIS OF THIS CAUSE. MAY CHANGE DURING THE PROBLEM ANALYSIS PROCESS | 'NOT AT FAULT' |
| PRIORITY | SINGLE-VALUED | INDICATES THE PRIORITY OF EXPLORING THAT CAUSE WHILE THE PROBLEM IS BEING INVESTIGATED | 'HIGH' |
| NOTES | MULTI-VALUED | A LIST OF ONE OR MORE COMMENTS ASSOCIATED TO THIS CAUSE. LIST ELEMENTS CAN BE INDIVIDUALLY ADDED, DELETED OR EDITED | 'I AM CHECKING THE LOGS' |
| ATTACHMENTS | MULTI-VALUED | A LIST OF FILES ASSOCIATED TO THE CAUSE. CAN BE INDIVIDUALLY ADDED, DELETED OR EDITED | APACHELOG.TXT |
| ACTIONS | MULTI-VALUED | A LIST OF ONE OR MORE ACTIONS THAT HAVE BEEN TAKEN, ARE BEING TAKEN NOW, OR ARE TO BE TAKEN IN FUTURE FOR THIS CAUSE. CAN BE INDIVIDUALLY ADDED, DELETED OR EDITED | REBOOT AT 4PM |
| ASSIGNED TO | MULTI-VALUED | A LIST OF ONE OR MORE USERS TO WORK ON THIS CAUSE | 'USER A','USER B' |
| PINNED SYMPTOMS | MULTI-VALUED | A LIST OF ONE OR MORE SYMPTOM IDENTIFIERS THAT ARE RELEVANT FOR ANALYZING THIS CAUSE | 'D2','W1' |

FIG. 8

| FAULT STATUS OF POTENTIAL CAUSES 902 | DESCRIPTION OF THE FAULT STATUS 904 | INTERPRETATION IN THE PROBLEM ANALYSIS PROCESS 906 | WEIGHT / ORDER OF PRECEDENCE 908 | INDICATIVE COLOR 910 |
|---|---|---|---|---|
| NOT RELEVANT | CAUSE IS CONFIRMED AS NOT RELEVANT FOR PROBLEM | CONFIRMED OUTCOME - CAUSE TO BE IGNORED | 0 | DARK GRAY |
| LIKELY NOT RELEVANT | CAUSE CONSIDERED AT THIS TIME AS UNLIKELY TO BE RELEVANT FOR PROBLEM | EXPECTED OUTCOME - TO BE CONFIRMED LATER | 1 | LIGHT GRAY |
| NOT AT FAULT | CAUSE IS CONFIRMED AS NOT RESPONSIBLE FOR PROBLEM | CONFIRMED OUTCOME - CAUSE IS CLEARED | 2 | GREEN |
| LIKELY NOT AT FAULT | CAUSE CONSIDERED AT THIS TIME AS UNLIKELY TO BE RESPONSIBLE FOR PROBLEM | EXPECTED OUTCOME - TO BE CONFIRMED LATER | 3 | LIGHT GREEN |
| UNKNOWN | NOT KNOWN IF CAUSE HAS CONTRIBUTED TO THE PROBLEM | INITIAL VALUE - UNDETERMINED STATUS | 4 | BLUE OR BLACK |
| LIKELY AT FAULT | CAUSE CONSIDERED AT THIS TIME AS LIKELY TO HAVE CONTRIBUTED TO THE PROBLEM | EXPECTED OUTCOME - TO BE CONFIRMED LATER | 5 | ORANGE |
| AT FAULT | CAUSE CONFIRMED TO HAVE CONTRIBUTED TO THIS PROBLEM | CONFIRMED OUTCOME - CAUSE LED TO PROBLEM | 6 | RED |

FIG. 9

| FAULT STATUS OF PARENT CAUSE / FAULT STATUS OF ANY CHILD | AT FAULT | LIKELY AT FAULT | UNKNOWN | LIKELY NOT AT FAULT | NOT AT FAULT | LIKELY NOT RELEVANT | NOT RELEVANT |
|---|---|---|---|---|---|---|---|
| AT FAULT | CONSISTENT | INCONSISTENT | INCONSISTENT | INCONSISTENT | INCONSISTENT | INCONSISTENT | INCONSISTENT |
| LIKELY AT FAULT | CONSISTENT | CONSISTENT | INCONSISTENT | INCONSISTENT | INCONSISTENT | INCONSISTENT | INCONSISTENT |
| UNKNOWN | CONSISTENT | CONSISTENT | CONSISTENT | INCONSISTENT | INCONSISTENT | INCONSISTENT | INCONSISTENT |
| LIKELY NOT AT FAULT | CONSISTENT | CONSISTENT | CONSISTENT | CONSISTENT | INCONSISTENT | INCONSISTENT | INCONSISTENT |
| NOT AT FAULT | CONSISTENT | CONSISTENT | CONSISTENT | CONSISTENT | CONSISTENT | INCONSISTENT | INCONSISTENT |
| LIKELY NOT RELEVANT | CONSISTENT | CONSISTENT | CONSISTENT | CONSISTENT | CONSISTENT | CONSISTENT | INCONSISTENT |
| NOT RELEVANT | CONSISTENT | CONSISTENT | CONSISTENT | CONSISTENT | CONSISTENT | CONSISTENT | CONSISTENT |

| CONCURRENT OPERATIONS PERFORMED ON THE SYMPTOMS TABLE 1302 | EXAMPLE OF OPERATIONS 1304 | OUTCOME OF THE CONCURRENT OPERATIONS 1306 |
|---|---|---|
| MULTIPLE USERS SIMULTANEOUSLY ADD, DELETE OR UPDATE DIFFERENT SYMPTOMS AT THE SAME TIME | USER A ADDS SYMPTOM S1, WHILE USER B DELETES A DIFFERENT SYMPTOM S2 AND USER C UPDATES SYMPTOM S3 | NO CONFLICT - ALL OPERATIONS SUCCEED AND GET MERGED INTO THE SYMPTOMS TABLE |
| MULTIPLE USERS SIMULTANEOUSLY UPDATE DIFFERENT ATTRIBUTES OF THE SAME SYMPTOM | USER A ADDS A NOTE TO SYMPTOM S1, AND USER B ADDS AN ATTACHMENT TO SYMPTOM S1 AT SAME TIME | NO CONFLICT - ALL OPERATIONS SUCCEED AND GET MERGED INTO THE SYMPTOMS TABLE |
| MULTIPLE USERS SIMULTANEOUSLY UPDATE THE SAME SINGLE-VALUED ATTRIBUTE OF THE SAME SYMPTOM | USER A SETS THE CATEGORY OF SYMPTOM S1 TO 'ERROR' WHILE USER B SETS THE SAME TO 'WARNING' | CONFLICT ERROR - AFTER THE VALUE HAS BEEN UPDATED BY ONE USER, OTHER UPDATES WILL FAIL |
| MULTIPLE USERS SIMULTANEOUSLY ADD, DELETE OR UPDATE DIFFERENT ELEMENTS OF SAME MULTI-VALUED ATTRIBUTE OF THE SAME SYMPTOM | USER A ADDS A NOTE N1 TO SYMPTOM S1, USER B DELETES A NOTE N2 FROM S1, WHILE USER C UPDATES A NOTE N3 FOR THE SAME SYMPTOM S1 | NO CONFLICT - ALL OPERATIONS SUCCEED AND GET MERGED INTO THE SYMPTOMS TABLE |
| MULTIPLE USERS SIMULTANEOUSLY UPDATE THE SAME ELEMENT IN A MULTI-VALUED ATTRIBUTE OF THE SAME SYMPTOM | USERS A, B AND C EDIT THE SAME NOTE ON SYMPTOM S1 AT THE SAME TIME | CONFLICT ERROR - AFTER THE VALUE HAS BEEN UPDATED BY ONE USER, OTHER UPDATES WILL FAIL |
| MULTIPLE USERS SIMULTANEOUSLY (1) DELETE AND UPDATE THE SAME ATTRIBUTE OF THE SAME SYMPTOM (2) DELETE A SYMPTOM AS OTHERS UPDATE ANY OF ITS ATTRIBUTES | (1) USER A DELETES A NOTE IN SYMPTOM S1, WHILE USER B UPDATES THAT SAME NOTE OF THE SAME SYMPTOM S1 AT THE SAME TIME (2) USER A DELETES A SYMPTOM S1 WHILE USERS B AND C UPDATE ATTRIBUTES OF S1 AT THE SAME TIME | ONCE AN ELEMENT GETS DELETED, UPDATES ON THAT ELEMENT WILL FAIL WITH CONFLICT ERROR. IF SOME OR ALL ELEMENT UPDATES HAPPEN BEFORE THE DELETION, THEN THOSE OPERATIONS SUCCEED WITH OVERLAP WARNING |

| CONCURRENT OPERATIONS ON THE CAUSE-EFFECT GRAPH 1402 | OUTCOME OF THE CONCURRENT OPERATIONS 1404 |
|---|---|
| MULTIPLE USERS PIN OR UNPIN DIFFERENT SYMPTOMS / CLUES | NO CONFLICT - ALL OPERATIONS SUCCEED AND GET MERGED INTO THE CAUSE-EFFECT GRAPH |
| MULTIPLE USERS PIN THE SAME SYMPTOMS / CLUES | NO CONFLICT - ALL OPERATIONS SUCCEED AND GET MERGED INTO THE CAUSE-EFFECT GRAPH |
| MULTIPLE USERS UNPIN THE SAME SYMPTOMS / CLUES | NO CONFLICT - ALL OPERATIONS SUCCEED AND GET MERGED INTO THE CAUSE-EFFECT GRAPH |
| MULTIPLE USERS CONNECT OR DISCONNECT ANY PAIRS OF SYMPTOMS / CLUES | NO CONFLICT - ALL OPERATIONS SUCCEED AND GET MERGED INTO THE CAUSE-EFFECT GRAPH |
| MULTIPLE USERS GROUP OR UNGROUP A SET OF SYMPTOMS / CLUES | NO CONFLICT - ALL OPERATIONS SUCCEED AND GET MERGED INTO THE CAUSE-EFFECT GRAPH |
| ONE USER DELETES A SYMPTOM FROM THE SYMPTOMS TABLE WHILE OTHER USERS PIN, UNPIN, CONNECT, DISCONNECT, GROUP OR UNGROUP THE SAME SYMPTOM ON THE CAUSE-EFFECT GRAPH | ONCE THE SYMPTOM IS DELETED, OPERATIONS INVOLVING THAT SYMPTOM ON THE CAUSE-EFFECT GRAPH WILL FAIL WITH CONFLICT ERRORS. IF SOME OR ALL OF THE OPERATIONS HAPPEN BEFORE DELETE OF THE SYMPTOM, THEN THOSE OPERATIONS WILL SUCCEED WITH OVERLAP WARNING |

| CONCURRENT OPERATIONS PERFORMED ON THE CAUSE TREE / FISHBONE DIAGRAM 1505 | EXAMPLE OF OPERATIONS 1504 | OUTCOME OF THE CONCURRENT OPERATIONS 1506 |
|---|---|---|
| MULTIPLE USERS ADD CAUSES TO THE CAUSE TREE/FISHBONE DIAGRAM AT THE SAME TIME | USER A ADDS CAUSE C1, AND USER B ADDS A CAUSE NAMED C2 ANYWHERE IN THE CAUSE TREE AT SAME TIME | NO CONFLICT - ALL OPERATIONS SUCCEED AND GET MERGED INTO CAUSE TREE |
| MULTIPLE USERS DELETE CAUSES FROM CAUSE TREE/FISHBONE DIAGRAM AT THE SAME TIME | USER A DELETES CAUSE C1, AND USER B DELETES A CAUSE C2 ANYWHERE IN THE CAUSE TREE AT SAME TIME | NO CONFLICT - ALL OPERATIONS SUCCEED AND GET MERGED INTO CAUSE TREE |
| SOME USERS ADD CAUSES WHILE OTHER USERS DELETE CAUSES FROM DIFFERENT SUBTREES IN THE CAUSE TREE/FISHBONE DIAGRAM AT THE SAME TIME | USER A ADDS A CAUSE C1.1 UNDER C1 AND USER B DELETES A CAUSE C2.1 UNDER C2, WHERE C1 AND C2 HAVE DIFFERENT OR SAME PARENT | NO CONFLICT - ALL OPERATIONS SUCCEED AND GET MERGED INTO CAUSE TREE |
| SOME USERS ADD CAUSES WHILE OTHER USERS DELETE THE PARENTS OR ANCESTORS OF THESE CAUSES IN THE CAUSE TREE/FISHBONE DIAGRAM AT THE SAME TIME | USER A ADDS A CAUSE C1.1 UNDER C1 AND USER B DELETES C1 (THE PARENT) OR AN ANCESTOR OF C1 AT THE SAME TIME | IF DELETE OF A PARENT / ANCESTOR HAPPENS FIRST THEN ADDITION OF CAUSES WILL FAIL CONFLICT ERROR, ELSE BOTH OPERATIONS WILL SUCCEED WITH OVERLAP WARNING |

| CONCURRENT OPERATIONS PERFORMED ON THE CAUSE TREE / FISHBONE 1602 | EXAMPLE OF OPERATIONS 1604 | OUTCOME OF THE CONCURRENT OPERATIONS 1606 |
|---|---|---|
| MULTIPLE USERS SIMULTANEOUSLY UPDATE ANY ATTRIBUTES OF DIFFERENT CAUSES | USER A SETS THE FAULT STATUS OF CAUSE C1 TO 'NOT AT FAULT' AND USER B ADDS A NOTE TO CAUSE C2 | NO CONFLICT - ALL OPERATIONS SUCCEED AND GET MERGED INTO CAUSE TREE |
| MULTIPLE USERS SIMULTANEOUSLY UPDATE DIFFERENT ATTRIBUTES OF THE SAME CAUSE | USER A CHANGES THE FAULT STATUS OF CAUSE C1 TO 'AT FAULT' AND USER B ADDS A NOTE TO THE SAME CAUSE C1 | NO CONFLICT - ALL OPERATIONS SUCCEED AND GET MERGED INTO CAUSE TREE |
| MULTIPLE USERS SIMULTANEOUSLY UPDATE THE SAME SINGLE-VALUED ATTRIBUTE OF THE SAME CAUSE | USERS A AND B UPDATE THE NAME OR FAULT STATUS OF A CAUSE C1 WITH DIFFERENT VALUES | CONFLICT ERROR - AFTER THE VALUE HAS BEEN UPDATED BY ONE USER, OTHER UPDATES WILL FAIL |
| MULTIPLE USERS SIMULTANEOUSLY ADD, DELETE OR UPDATE DIFFERENT ELEMENTS OF SAME MULTI-VALUED ATTRIBUTE IN SAME CAUSE | USER A ADDS A NOTE N1, USER B DELETES A NOTE N2, USER C UPDATES A NOTE N3 FOR THE SAME CAUSE C1 | NO CONFLICT - ALL OPERATIONS SUCCEED AND GET MERGED INTO CAUSE TREE |
| MULTIPLE USERS SIMULTANEOUSLY UPDATE THE SAME ELEMENT IN A MULTI-VALUED ATTRIBUTE OF THE SAME CAUSE | USERS A, B AND C UPDATE THE SAME NOTE ON CAUSE C1 AT THE SAME TIME | CONFLICT ERROR - AFTER THE VALUE HAS BEEN UPDATED BY ONE USER, OTHER UPDATES WILL FAIL |
| MULTIPLE USERS SIMULTANEOUSLY DELETE AND UPDATE THE SAME ELEMENT IN A MULTI-VALUED ATTRIBUTE OF THE SAME CAUSE | USER A DELETES A NOTE IN CAUSE C1, WHILE USER B UPDATES THAT SAME NOTE OF THE SAME CAUSE C1 | ONCE THE ELEMENT GETS DELETED, UPDATES ON THAT ELEMENT IN THE MULTI-VALUED ATTRIBUTE WILL FAIL WITH A CONFLICT ERROR. IF SOME OR ALL ELEMENT UPDATES HAPPEN BEFORE THE DELETE, THEN THOSE OPERATIONS SUCCEED WITH OVERLAP WARNING. |
| A USER DELETES A CAUSE WHILE AT THE SAME TIME OTHERS UPDATE ATTRIBUTES OF THAT SAME CAUSE OR A SUB-CAUSE WITHIN THE SUB-TREE ROOTED AT THAT SAME CAUSE | USER A DELETES A CAUSE C1, WHILE USERS B AND C UPDATE ATTRIBUTES OF THE CAUSE C1 OR ANY OF ITS DESCENDANT CAUSES | ONCE THE CAUSE GETS DELETED, ALL UPDATES ON THAT CAUSE AND IN THE SUB-TREE OF THAT CAUSE WILL FAIL WITH CONFLICT ERROR. IF SOME OR ALL ATTRIBUTE UPDATES HAPPEN BEFORE THE DELETE, THEN THOSE OPERATIONS SUCCEED WITH OVERLAP WARNING. |
| A USER DELETES A SYMPTOM FROM THE SYMPTOMS TABLE WHILE ONE OR MORE USERS TRY TO PIN IT ON ANY CAUSE IN CAUSE TREE / FISHBONE DIAGRAM | USER A DELETES A SYMPTOM S1 FROM THE SYMPTOMS TABLE, WHILE USER B PINS IT TO A CAUSE C1 AND USER C PINS IT TO A CAUSE C2 IN THE CAUSE TREE/FISHBONE | ONCE THE SYMPTOM IS DELETED, ALL PINS OF THAT SYMPTOM WILL FAIL WITH A CONFLICT ERROR. IF SOME OR ALL SYMPTOM PINS HAPPEN BEFORE DELETE OF THE SYMPTOM, THEN THOSE OPERATIONS SUCCEED WITH OVERLAP WARNING. |

METHODS AND SYSTEMS FOR COLLABORATIVE EVIDENCE-BASED PROBLEM INVESTIGATION AND RESOLUTION

TECHNICAL FIELD

Embodiments of the disclosure relate generally to a field of problem investigation and resolution and, more particularly to, methods and systems for collaborative evidence-based problem investigation and resolution.

BACKGROUND

Businesses and enterprises typically involve applications and systems that are critical for their operation. The mission-critical systems need to be running with high availability, as any downtime or outage will imply lost revenue and/or lost productivity. Goodwill and reputation among customers and stakeholders are often at stake if critical services are slow or unavailable. As such, system administrators, operations and support teams are responsible for keeping these systems running smoothly 24×7. They are responsible for monitoring the systems on an on-going basis as well as for promptly resolving any problems or incidents that may arise in them. The systems can be any software or non-software system including multiple complex components. The systems include, but are not limited to, computing systems, telecommunication systems, or electro-mechanical systems.

A problem investigation typically starts with the gathering of evidence related to the manifestation of the problem, such as any errors and anomalies, or lack thereof, observed in the system leading up to and around the time of problem occurrence. One or more investigators try to understand how and why the problem happened and perform a cause analysis or root cause analysis to identify the causal factor(s) that led to the problem. This cause analysis phase may require exploring not only the components within the system but also external factors such as human error or operational disruptions such a power outage. It may also involve the gathering more evidence to help with the analysis, as well as understanding the 'cause-effect' relationships between the observed events. Steps to quickly restore any disruption in service may be called for, even if it is a 'stop-gap' solution. Once one or more causes for the problem have been properly identified and understood, investigators need to devise steps to fix the problem or work around it, either permanently or temporarily.

Currently, business systems have become increasingly complex and distributed in nature, with multiple subject matter experts (SMEs) responsible for different parts of the system. Problems i.e., faults in these systems are often difficult and time-consuming to resolve. This is due to several factors, as discussed below:

Cross-Functional Problems: Multiple SMEs and teams with different skill sets are frequently involved in resolving problems that arise in complex systems. As an example, an e-commerce IT application may consist of multiple components, such as database, network, web-based order entry system, order shipment & tracking system, etc. Some of these software components may be hosted or accessed through SaaS (Software as a Service) endpoints in the cloud. A problem with such a complex multi-functional system may require the involvement of different collaborators from various teams, who may be working at different times and from various locations. Today, there are no tools available for coordinating the investigation and resolution strategy, status and actions amongst the teams/team members in real time. Generally text-based emails, chats and incident tracking tools are used for coordination amongst teams/team members which are not efficient for this purpose, as the linear text-based updates in these tools can get very long and convoluted, and the text needs to be read and interpreted correctly by all investigators and stakeholders which takes up much time and effort.

Distributed Virtual Teams: Nowadays, operation and support teams are mostly located in geographically diverse locations. Enterprises may have multiple offices within or across countries, and might also have out-sourced Data Centers located in different countries. Thus, teams that are responsible for managing a complex business system or application are not likely to be physically co-located in the same office or building. These teams may also span different time zones. Hence, the traditional models of 'brain-storming' or 'war room' sessions in a single physical room with a whiteboard to get everyone on the 'same page' and agree on an investigation strategy has been replaced by the notion of virtual teams which mostly communicate and collaborate online. Significant difficulties are currently encountered in this scenario, such as:

Fragmented Collaboration: Distributed teams use a variety of online mechanisms to communicate, such as conference calls, emails and chats, and updates in an issue tracking/ticketing system such as JIRA™, Remedy™ or ServiceNow™. There is often an overload of text-based information, e.g., 10 people working together on a problem could easily generate 100 messages or updates in 1-2 days. It is difficult to write or read and understand this amount of information in a natural language such as English. This difficulty is compounded by the fact that some team members may not be native speakers of that language, adding to the burden of communication. Moreover, given the volume of information exchanged, most people do not read all the emails, ticket updates or notes that get circulated within the team investigating a problem. As a result, team members are often not on the 'same page' with respect to who is doing what, resulting in chaotic uncoordinated actions that may be well-intentioned but in fact delay resolution.

Inefficient Handover: For high availability systems, distributed teams often work in shifts, providing round-the-clock service for system support. There are inherent coordination issues in this hand-over process, such as understanding what has already been done by a prior worker in the 8-hour shift. This communication is typically done using emails or notes in an issue tracking system, requiring the person on the next shift to read and understand the approach being taken to solve the problem and the work already done. Errors and omissions in voice or text-based communication during this handover process often result in duplication of work, confusion and time delays.

Unclear Progress & Status: Team managers and system supervisors are generally the points of contact for tracking and communicating the progress and current status of a problem or incident to the concerned stakeholders. Managers often need to 'gather and collate' information from multiple team members to understand exactly what has been done and what remains to be done by whom in order to drive the investigation of a particular problem. In other words, a 'picture' of the current investigation status needs to be first understood by managers and then communicated to others, with this picture changing as the investigation progresses. The difficulty of this task increases with the team size, location of members, and the complexity of the problem at hand. Tracking down the activities and investigation outcomes of various components and sub-components handled by different teams is very time-consuming and laborious for managers, even if they are documented in detail in the service tickets or emails. The problem is exacerbated for teams that are geographically distributed but can be significant even for teams located in the same physical space.

Difficulty in Reusing Knowledge: After an important problem has been resolved, teams may be required to do a 'Post-Mortem Review' of the problem. This step requires reconstructing the actions and decisions that were taken while the investigation was going on and reviewing the timeline of the actions and decisions, including who did what and when. This review process can be quite painstaking and tedious. The goal of a post-mortem review is to understand what was done right and what could be improved upon, and often results in a 'knowledge article' to record this experience. Such knowledge articles have to be written, read and understood carefully and also have to be applied at the right time in order to be useful. This text-based process of knowledge collection and searching is laborious, highly inefficient and error-prone.

Aside from knowledge articles and troubleshooting guides, prior solved problem tickets frequently hold information that would be relevant for resolving a new problem. However, much of this information is generally available in unstructured text format, which needs to be manually searched through keywords/phrases. For a future urgent problem/incident, the team investigating the issue is typically under high time pressure, so manual searches and results filtering to find relevant information take away valuable time.

In the light of the above discussion, there is a need for methods and systems that enable systematic real-time collaborative investigations of problems by multiple users/teams, along with self-learned prescriptive recommendations to help expedite the resolution of new problems.

SUMMARY

Various embodiments of the present disclosure provide methods and systems for collaborative evidence-based problem investigation and resolution.

In an embodiment, a method is disclosed. The method includes receiving data related with problems or faults that have occurred in a faulty system. The data includes one or more symptoms and one or more details associated with each symptom of the one or more symptoms. The method includes arranging the data in a symptoms table. The symptoms table include one or more rows for describing the one or more symptoms and a plurality of columns for defining the one or more details associated with each symptom. The method includes facilitating updating of the symptoms table by one or more users of a plurality of users in order to indicate one or more clues among the one or more symptoms for the fault or to update symptom details. The method includes causing provisioning of a cause-effect user interface (UI) on one or more display screens of one or more electronic devices of the one or more users for facilitating creation of a cause-effect graph using the one or more clues. The method includes creating a cause-tree/fishbone diagram based in part on at least one of: one or more causes defined by the one or more users based on domain experience, one or more symptoms and clues defined in the symptoms table, one or more components of the faulty system, and historical data of prior problem investigations. The method further includes displaying the cause-tree/fishbone diagram on one or more display screens of one or more electronic devices of the one or more users for facilitating determination of one or more potential causes responsible for causing the fault based on one or more evidences and one or more recommendations for resolving the fault.

In another embodiment, a server system is disclosed. The server system includes a memory to store instructions and a processor to execute the stored instructions in the memory and thereby cause the server system to receive data related with problems or faults that have occurred in a faulty system. The data includes one or more symptoms and one or more details associated with each symptom of the one or more symptoms. The server system is further configured to arrange the data in a symptoms table. The symptoms table includes one or more rows for describing the one or more symptoms and a plurality of columns for defining the one or more details associated with each symptom. The server system is further configured to facilitate updating of the symptoms table by one or more users of a plurality of users in order to indicate one or more clues among the one or more symptoms for the fault or to update symptom details. The server system is further configured to provision a cause-effect user interface (UI) on one or more display screens of one or more electronic devices of the one or more users for facilitating creation of a cause-effect graph using the one or more clues. The server system is further configured to create a cause-tree/fishbone diagram based in part on at least one of: one or more causes defined by the one or more users based on domain experience, one or more symptoms or clues defined in the symptoms table; one or more components of the faulty system; and historical data of prior problem investigations. The server system is further configured to display the cause-tree/fishbone diagram on one or more display screens of one or more electronic devices of the one or more users for facilitating determination of one or more potential causes responsible for causing the fault based on one or more evidences and one or more recommendations for resolving the fault.

In yet another embodiment, a system is disclosed. The system includes a database, a user interface (UI) module, a fault data receiving module, a fault analysis module, a reporting module, a recommendation engine and a processing module. The database is configured to store data related with one or more problems that are investigated and solved using the system. The UI module is in communication with the database. The UI module is configured to present one or more UIs for facilitating collaborative evidence-based problem investigation and resolution. The fault data receiving module is in communication with the UI module and the database. The fault data receiving module is configured to receive data relevant for investigation of faults that have occurred in a faulty system. The fault analysis module is in communication with the database, UI module and the fault data receiving module. The fault analysis module is configured to facilitate fault analysis and tracking of status and progress of the investigation. The reporting module is configured to facilitate reporting and sharing of investigation status reports based on the updates done on the symptoms table, the cause-effect graph and the cause-tree/fishbone diagram, and compilation and reporting of individual or aggregate key performance indicators (KPIs) for the investigations such as resolution time and investigation team size. The recommendation engine is configured to make prescriptive recommendations for new faults using the data related with the existing faults stored in the database. The prescriptive recommendations include one or more likely clues and their cause-effect relationships for a new fault, one or more users who are qualified to find solutions for the new fault, one or more potential causes for the new fault, and one or more potential solutions for resolving the new fault. The processing module is configured to coordinate with the database, the UI module, the fault data receiving module, the fault analysis module, the reporting module, and the recommendation engine for operation of the various components of the system. In an embodiment, the processing, communication, and coordination that occur among the components of the system may be performed by one or more modules of the system 200.

BRIEF DESCRIPTION OF THE FIGURES

For a more complete understanding of example embodiments of the present technology, reference is now made to the following descriptions taken in connection with the accompanying drawings in which:

FIG. 3 is an example representation of a symptoms table, in accordance with an example embodiment;

FIG. 8 is an example representation of an attribute table for causes, in accordance with an example embodiment;

FIG. 9 is an example representation of a table depicting a plurality of values associated with a fault-status attribute, in accordance with an example embodiment;

FIG. 11 is an example representation of a fault status consistency matrix for a cause tree/fishbone diagram, in accordance with an example embodiment;

FIG. 13 is an example representation of a table depicting concurrency model for a symptoms table, in accordance with an example embodiment;

FIG. 14 is an example representation of a table depicting concurrency model for a cause-effect graph, in accordance with an example embodiment;

FIG. 15 is an example representation of a table depicting concurrency model for addition and deletion of causes on the cause-tree/fishbone diagram, in accordance with an example embodiment;

FIG. 16 is an example representation of a table depicting concurrency model for addition, deletion and updating of attributes of causes on the cause-tree/fishbone diagram, in accordance with an example embodiment;

Figure 1:
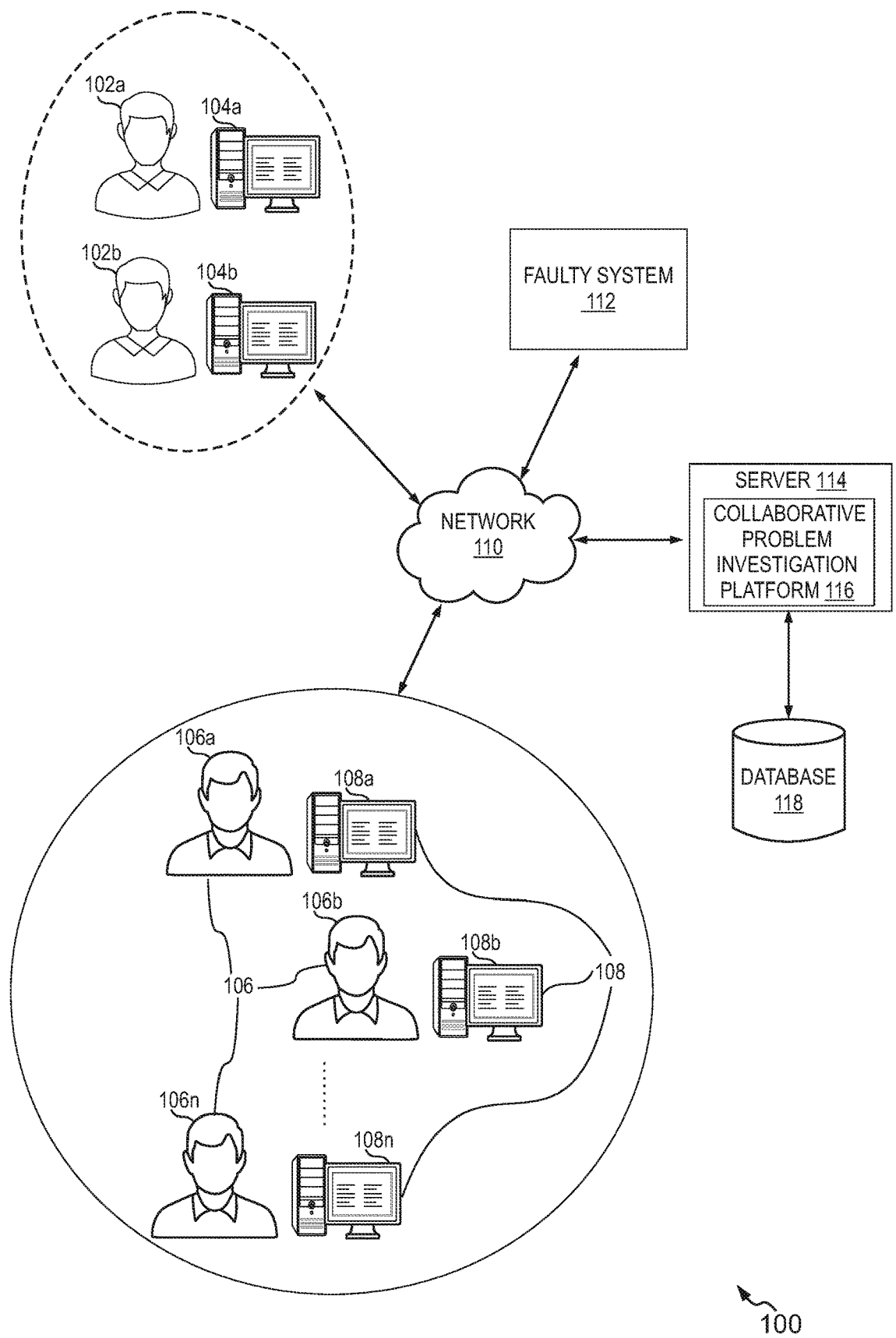
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for collaborative evidence-based problem investigation and resolution.

A collaborative problem investigation platform is provided for collaborative evidence-based problem analysis of a problem occurring in a faulty system. The collaborative problem investigation platform provides interactive visual diagrams that are concurrently updatable in real time by investigators to promote shared understanding of the problem during a complex problem investigation.

For facilitating evidence-based problem analysis, the collaborative problem investigation platform generates an updatable symptoms table by arranging data related with a fault that has occurred in the faulty system in the symptoms table. The data includes one or more symptoms associated with the fault and few details associated with each symptom. The investigators can go through the symptoms table to define one or more clues associated with the fault. The defined clues can be arranged by the investigators on a cause-effect user interface for generating a cause-effect graph that helps in determining cause-effect relationships between the clues relevant for the problem. In an embodiment, the cause-effect graph with one or more directed arrows may be used to represent causality relationships between the one or more clues. In another embodiment, other representations can also be used to present causality relationships between the one or more clues.

The collaborative problem investigation platform also creates and displays an updatable cause-tree/fishbone diagram for facilitating collaborative and hierarchical cause analysis for the fault. This cause-tree/fishbone diagram helps the investigators (SMEs) in systematically exploring potentially faulty components as well as external issues and also helps in identifying one or more factors responsible for the problem. The cause-tree/fishbone diagram may be created based in part on at least one of: one or more causes defined by the investigators based on their domain experience, one or more symptoms or clues defined in the symptoms table, one or more components of the faulty system, and historical data of prior problem investigations. In the cause-tree/fishbone diagram, the problem that has occurred in the faulty system is generally represented as the head and one or more potential causes that can lead to the problem are represented as the bones. The bones branch off from a spine for representing major causes, with sub-branches for sub-causes, to as many levels as required. Each cause in the cause-tree/fishbone diagram may have certain attributes, such as name, category, deadline, fault-status etc., associated with it to help with systematic evidence-based cause analysis during investigation by the investigators. The collaborative problem investigation platform records each and every action performed by the investigators on the cause-tree/fishbone diagram prepared for the fault in an audit trail. The collaborative problem investigation platform also provides prescriptive recommendations for resolving future problems using the audit trail.

The term 'supervisors' here refers to persons who is supervising a task of identification and resolution of faults occurring in a faulty system. The terms 'problem' and 'fault' have been used interchangeably throughout the description and refer to one or more instances of anomalous behavior in the faulty system. The terms 'investigators' and 'users' have been used interchangeably throughout the description and refer to persons who are involved in performing task of identification and resolution of the faults occurring in the faulty system.

FIG. 1 is an illustration of an environment 100 related to at least some example embodiments of present disclosure. The environment 100 includes, but is not limited to, a wireless communication network (e.g., a network 110) that connects entities such as, supervisors 102a and 102b, a plurality of investigators 106a to 106n, a faulty system 112 and a server 114. The supervisors 102a and 102b are depicted to be associated with electronic devices 104a and 104b (hereinafter referred to as 'supervisor devices 104a and 104b'), respectively. It should be noted that the two supervisors are shown for the sake of simplicity, there can be more or less number of supervisors. The investigators 106a to 106n are depicted to be associated with electronic devices 108a to 108n (hereinafter referred to as 'investigator devices 108a to 108n'), respectively. It should be noted that the investigators 106a to 106n are collectively referred as an investigator 106 and the investigator devices 108a to 108n are collectively referred as an investigator device 108.

In at least one example embodiment, the supervisor devices 104a and 104b and the investigator device 108 are equipped with a collaborative problem investigation platform 116 that facilitates collaborative evidence-based problem investigation and resolution. The supervisor devices 104a and 104b and the investigator device 108 may be any communication devices having hardware components for enabling User Interfaces (UIs) of the collaborative problem investigation platform 116 to be presented on the supervisor devices 104a and 104b and the investigator device 108. The supervisor devices 104a and 104b and the investigator device 108 may be capable of being connected to a wireless communication network (such as the network 110). Examples of the supervisor devices 104a and 104b and the investigator device 108 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

In at least one example embodiment, the supervisors 102a and 102b may access the collaborative problem investigation platform 116 for reviewing investigation status reports associated with a problem/fault that has occurred in a faulty system 112 and for taking decisions for resolving the problem based on the investigation status reports. The collaborative problem investigation platform 116 may enable the supervisors 102a and 102b to effectively track the status and progress of the investigation performed to determine potential causes behind the problem that has occurred in the faulty system 112. In an embodiment, the faulty system 112 is a software system. Examples of the problem/fault that can occur in the software system include, but are not limited to, website outage, failed user logins (i.e., inability to access the system), slow data entry, corrupt or invalid data, and other unexpected or undesirable occurrences such as hacker attacks by unauthorized users. In another embodiment, the faulty system 112 is a non-software system. Examples of the problem/fault that can occur in the non-software system include automobile engine not working, aircraft not working, networks not transmitting data, machinery in a factory not working as smoothly as expected etc.

In an embodiment, the investigators 106a to 106n may access the collaborative problem investigation platform 116 for identifying potential causes that are leading to the problem occurring in the faulty system 112 and for determining actions that need to be taken for resolving the problem occurring in the faulty system 112. The collaborative problem investigation platform 116 enables investigators 106a to 106n to jointly analyse issues that are leading to the problem in the faulty system 112. In at least one example embodiment, the investigators 106a to 106n are subject matter experts (SMEs) responsible for different modules/machinery of the faulty system 112 and their team members working with SMEs on different modules for resolving the problem that has occurred in the faulty system 112.

In an embodiment, the server 114 provides a software application, herein referred to as the collaborative problem investigation platform 116, in response to request received from the supervisor devices 104a and 104b or the investigator devices 108a to 108n (associated with the investigators 106a to 106n, respectively) via the network 110. Examples of the network 110 include stand alone or a combination of a local area network (LAN), a wide area network (WAN), wireless, wired, any currently existing or to be developed network that can be used for communication. More specifically, an example of the network 110 can be the Internet which may be a combination of a plurality of networks. In some embodiments, the collaborative problem investigation platform 116 may be factory-installed on the supervisor devices 104a and 104b and the investigator devices 108a to 108n and the supervisors 102a and 102b and the investigators 106a to 106n may not need to specifically request the collaborative problem investigation platform 116 from the server 114.

In at least one example embodiment, the collaborative problem investigation platform 116 is configured to provide interactive visual diagrams on their interfaces, which are concurrently updatable in real time by investigators 106a to 106n to promote shared understanding among them during investigation of the problem that has occurred in the faulty system 112. The evidences/symptoms collected for the fault are recorded in a symptoms table which is concurrently updatable by the investigators 106a to 106n. In an embodiment, the evidences/symptoms are collected by monitoring tools that are monitoring the faulty system 112 and are provided to the server 114 using the network 110. In another embodiment, the evidences/symptoms are provided manually to the server 114 by the supervisors 102a and 102b or investigators 106a to 106n using the network 110.

In an embodiment, the collaborative problem investigation platform 116 may provide real time 'in-context' collaboration for problem analysis using visual diagrams. For example, potential causes for the problem may have attributes such as names, priorities, fault statuses, task owners etc., and all these attributes are visually represented in the visual diagrams for quick and easy reference. The investigators 106a to 106n can perform concurrent updates on these attributes using an interactive visual user interface provided on the investigator devices 108a to 108n.

In an embodiment, the collaborative problem investigation platform 116 may enable the investigators 106a to 106n to perform exploration of potential causes that are causing a fault in the faulty system 112 in a methodical manner by creating a hierarchical cause-tree diagram. In the cause-tree diagram, the potential causes may split up recursively into sub-causes, with each cause or sub-cause having its own attributes such as name, notes, fault status etc. to enable the investigators 106a to 106n to perform systematic cause analysis of the fault that occurred in the faulty system 112. In an embodiment, the cause-tree is displayed as a fishbone diagram which is a compact visual representation of the cause-tree hierarchy. In an embodiment, the cause-tree/ fishbone diagram may be used to represent hierarchy of potential causes and their attributes. In another embodiment, other representations can also be used to represent hierarchy of potential causes and their attributes.

In an example scenario, as shown in FIG. 1, the faulty system 112 may not be working properly because of a problem/fault that has occurred in the faulty system 112 and the supervisors 102a and 102b supervising the functioning of the faulty system 112 may have been asked to resolve the problem as soon as possible. The supervisors 102a and 102b may then ask investigators 106a to 106n to investigate and resolve the problem. The investigators 106a to 106n may use the collaborative problem investigation platform 116 installed on the investigator devices 108a to 108n to investigate about the problem that has occurred in the faulty system 112. The data related with the problem that has occurred in the faulty system 112 may be already present with the collaborative problem investigation platform 116. The data includes one or more symptoms that are relevant to the occurrence of the problem and one or more details associated with each symptom. The problem symptoms are arranged in a concurrently updatable tabular format called the symptoms table (shown in FIG. 3) available in the collaborative problem investigation platform 116.

In at least one example embodiment, one or more investigators of the investigators 106a to 106n may use the symptoms table available in the collaborative problem investigation platform 116 to identify one or more clues. In an embodiment, a clue is a symptom that indicates notable event for causing the failure in the faulty system. The investigators may post the identified one or more clues on a cause-effect user interface (UI) provided on the collaborative problem investigation platform 116. The investigators may also connect the clues posted on the cause-effect user interface with causal arrows to form a cause-effect graph (shown in FIG. 5). In the cause-effect graph, nodes of the graph correspond to the clues for the problem and the clue that happened earlier in time may be connected to a clue that happened later through the directed arrow to indicate that there is a cause-effect relationship between the two clues. In an embodiment, a plurality of clues may be grouped together in a group to indicate a correlation between them. In an embodiment, the cause-effect graph with one or more directed arrows may be used to represent causality relationships between the one or more clues. In another embodiment, other representations can also be used to present causality relationships between the one or more clues.

In an embodiment, the collaborative problem investigation platform 116 may also provide a visual/graphic tool to the investigators 106a to 106n in form of a cause-tree diagram or a fishbone diagram for performing collaborative and hierarchical cause analysis for the fault as the tool may provide help to the investigators (SMEs) in exploring potentially faulty components as well as external issues and also help in identifying one or more factors responsible for the problem. In the fishbone diagram, the problem that has occurred in the faulty system 112 is represented as the head and one or more causes that can lead to the problem are represented as bones on the spine, with sub-branches for sub-causes, to as many levels as required. Each cause in the fishbone diagram may have certain attributes, such as name, category, deadline, fault-status etc. associated with it to help with systematic evidence-based cause analysis during investigation by the investigators 106a to 106n.

The investigators 106a to 106n may perform failure analysis of the potential causes listed in the fishbone diagram based on collected evidences to determine potential causes leading to the failure of the faulty system 112. Once the potential causes are identified, steps for recovery and/or repair are finalized and executed by the investigators 106a to 106n to resolve the problem. In an embodiment, each and every action taken by the investigators 106a to 106n for resolving the problem is recorded and stored by the collaborative problem investigation platform 116 in a database 118 associated with the server 114. The recorded data may further used by the collaborative problem investigation platform 116 for the purposes of reporting/analytics as well as for generating prescriptive recommendations for new problems.

The collaborative problem investigation platform 116 is an application resting at the server 114. In an embodiment, the server 114 is configured to manage the collaborative problem investigation platform 116 and communicate with devices, such as the supervisor and investigator devices 104a, 104b and 108 using the network 110. The collaborative problem investigation platform 116 may be accessed through the web via the network 110. In an embodiment, collaborative problem investigation platform 116 may be accessed through the web using Internet.

Figure 22:
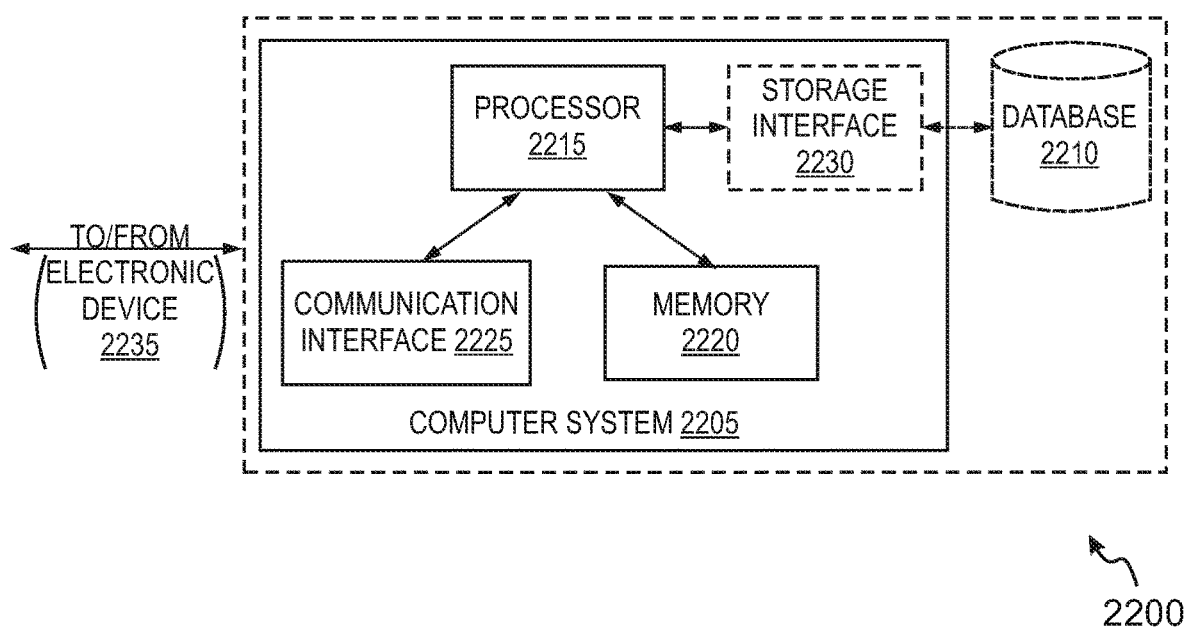
FIG. 22 is a block diagram of a server system of FIG. 1 in which a collaborative problem investigation platform may be stored, in accordance with an example embodiment of the present disclosure.

It is noted that the instructions (or the executable code) configuring the collaborative problem investigation platform 116 are stored in a memory of the server 114, and the instructions are executed by a processor (for example, a single-core or a multi-core processor) included within the server 114, as is exemplarily shown with reference to FIG. 22. Accordingly, even though the various functionalities for collaborative evidence-based problem investigation and resolution are explained with reference to or being performed by the collaborative problem investigation platform 116, it is understood that the processor in conjunction with the code in the memory is configured to execute the various tasks as enabled by the instructions of the collaborative problem investigation platform 116.

The various components of the collaborative problem investigation platform 116 are further explained with reference to FIG. 2.

Figure 2:
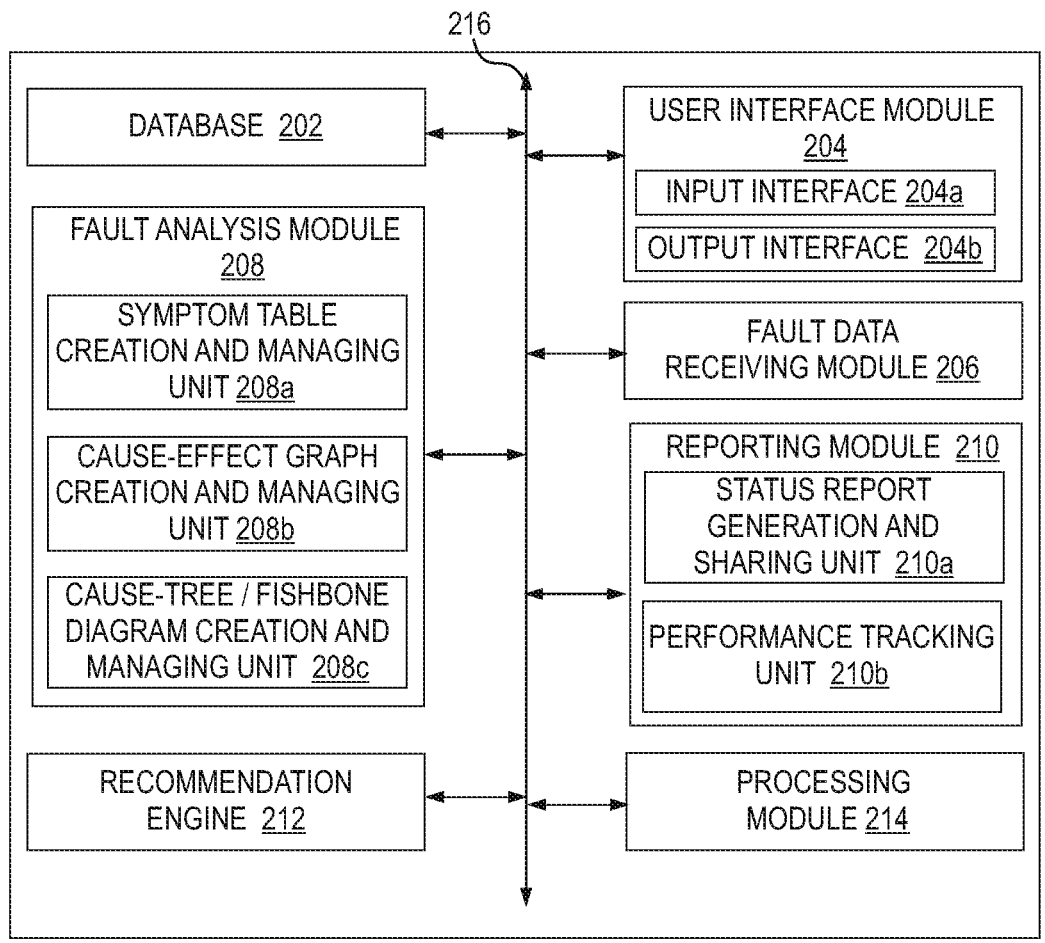
FIG. 2 is a block diagram of a system for collaborative evidence-based problem investigation and resolution, in accordance with an example embodiment.

FIG. 2 is a block diagram of a system 200 for collaborative evidence-based problem investigation and resolution, in accordance with an example embodiment. The system 200 may be embodied in a server, such as the server 114 or electronic devices, such as, the supervisor devices 104a and 104b and the investigator device 108. The system 200 enables a plurality of users (e.g., the supervisors 102a, 102b and the investigators 106a to 106n) to perform collaborative evidence-based problem investigation of a problem occurring in a faulty system (e.g., the faulty system 112) and to find a solution to solve the problem.

In an embodiment, the system 200 includes a database 202, a user interface (UI) module 204, a fault data receiving module 206, a fault analysis module 208, a reporting module 210, a recommendation engine 212 and a centralized circuit system 214. The fault analysis module 208 further includes a symptom table creation and managing unit 208a, a cause-effect graph creation and managing unit 208b and a cause-tree/fishbone diagram creation and managing unit 208c. The reporting module 210 further includes a status report generation and sharing unit 210a and a performance tracking unit 210b for compilation of individual and aggregate key performance indicators (KPIs) for the problem investigations.

The database 202 is configured to store data related with one or more problems/faults that are investigated and solved using the system 200 or the historical data from prior problem investigations. The data includes context of each problem, one or more symptoms associated with each problem, fault analysis outcomes of each problem (e.g., the one or more potential causes responsible for causing the problem), information about users who were involved in resolving the problem and the one or more solutions that are provided by the users for resolving the problem. The database 202 may be also configured to store concurrency rules and concurrency control models for each of a symptoms table, a cause-effect graph and a cause-tree/fishbone diagram, and the fault status values and their precedence rules for propagation. In an embodiment, the database may store solved problem cases from various web community forums & internal knowledge bases that are outside of the system 200.

The user interface module 204 is in communication with the database 202. The user interface module 204 is configured to present one or more UIs for facilitating collaborative evidence-based problem investigation and resolution. The UI module 204 includes an input interface 204a and an output interface 204b. The input interface 204a is configured to receive data associated with the problem. The data includes one or more symptoms associated with the problem and one or more details associated with each symptom of the one or more symptoms. The input interface 204a is also configured to receive updates made by one or more users on the symptoms table, the cause-effect graph and the fishbone diagram associated with the problem. Examples of the input interface 204a may include, but are not limited to, a keyboard, a mouse, a joystick, a keypad, a touch screen, soft keys, a floppy disk, a pen drive, a hard drive and the like. The output interface 204b is configured to display the UIs for facilitating collaborative evidence-based problem investigation and resolution. In an embodiment, the output interface 204b is configured to display a concurrently updatable tabular format called the symptoms table including one or more symptoms associated with the problem that have been observed in the faulty system. In another embodiment, the output interface 204b is configured to display a cause-effect user interface (UI) for facilitating creation of a cause-effect graph. In yet another embodiment, the output interface 204b is configured to display a fishbone diagram associated with the problem for facilitating collaborative evidence-based cause analysis of the problem. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The fault data receiving module 206 is in communication with the UI module 204 and the database 202. The fault data receiving module 206 is configured to receive data relevant for investigation of the faults that have occurred in the faulty system. The data includes monitoring data, log event data, system alerts and anomalies occurring in the faulty system. In an embodiment, the data is provided by monitoring tools that collect and continuously analyze data of the faulty system. In another embodiment, that data is automatically pulled from the faulty system by connecting the system 200 to the monitoring tools through application program interfaces (API's). In yet another embodiment, the data is manually provided by the users of the system 200. In at least one example embodiment, the data of the fault data receiving module 206 may be stored in the database 202 where it can be accessed by the other modules including the recommendation engine 210. The fault analysis module 208 is in communication with the database 202, the UI module 204 and the fault data receiving module 206. The fault analysis module 208 is configured to facilitate fault analysis and tracking of status and progress of the investigation. The fault analysis module 208 includes the symptom table creation and managing unit 208a, the cause-effect graph creation and managing unit 208b, and the cause-tree/fishbone diagram creation and managing unit 208c.

In an embodiment, the symptom table creation and managing unit 208a is configured to create a symptom table associated with the problem by arranging the data relevant for investigation of the fault in the symptoms table. The data includes one or more symptoms and one or more details associated with each symptom of the one or more symptoms. The symptom table creation and managing unit 208a is also configured to facilitate concurrent updating of the symptoms table by allowing concurrent operations to be performed on one or more rows and a plurality of columns of the symptoms table by at least two users of the plurality of users as per the concurrency control model provided for the symptoms table. The concurrent operations that can be performed on the symptoms table include, but are not limited to, addition of one or more new symptoms in the symptoms table; deletion of at least one of the one or more symptoms in the symptoms table; addition, deletion, and updating of symptom identifiers; addition, deletion, and updating of symptom patterns; addition, deletion, and updating of times of occurrences of symptoms; addition, deletion, and updating of the components for symptoms in the symptoms table; addition, deletion, and updating of categories for symptoms in the symptoms table, addition, deletion and updating of a note to a symptom in the symptoms table; addition, deletion and updating of an attachment to a symptom in the symptoms table; marking of at least one of the one or more clues in the symptoms table, and unmarking of at least one of the one or more clues in the symptoms table. The symptom table creation and managing unit 208a is further configured to merge results of the concurrent operations performed on the symptoms table to form an updated symptoms table. The symptom table creation and managing unit 208a is furthermore configured to facilitate display of the updated symptoms table to at least some of the one or more users.

The cause-effect graph creation and managing unit 208b is in communication with the symptom table creation and managing unit 208a for extracting one or more clues that are marked in the symptoms table. The cause-effect graph creation and managing unit 208b is configured to facilitate display of a cause-effect user interface (UI) on one or more display screens of one or more electronic devices of the one or more users for facilitating creation of a cause-effect graph by the one or more users using the one or more clues marked in the symptoms table. The cause-effect graph creation and managing unit 208b is configured to facilitate concurrent updating of the cause-effect graph by at least two users of the plurality of users as per the concurrency control model provided for the cause-effect graph to generate an updated cause-effect graph. In an embodiment, the updated cause-effect graph includes an updated cause-effect relationship between the one or more clues. The cause-effect graph creation and managing unit 208b is further configured to facilitate display of the updated cause-effect graph to at least some of the one or more users.

The cause-tree/fishbone diagram creation and managing unit 208c is in communication with the symptom table creation and managing unit 208a and the cause-effect graph creation and managing unit 208b. The cause-tree/fishbone diagram creation and managing unit 208c is configured to create a cause-tree or a fishbone diagram based in part on at least one of: one or more causes defined by the one or more users based on domain experience, one or more symptoms and clues defined in the symptoms table, one or more components of the faulty system, and the historical data from prior problem investigations in order to facilitate collaborative evidence-based cause analysis of the problem that has occurred in the faulty system. The cause-tree/fishbone diagram creation and managing unit 208c is also configured to facilitate simultaneous updating of the cause-tree or the fishbone diagram by at least two users of the plurality of users as per the concurrency control model provided for the cause-tree or the fishbone diagram. The cause-tree/fishbone diagram creation and managing unit 208c is further configured to facilitate recording of the one or more updates performed by the plurality of users on the cause-tree diagram in an audit trail maintained for the fault/problem. In an embodiment, the audit trail maintained for the faults can be used for generating prescriptive recommendations for one or more new faults upon determining a similarity between the prior faults and the new fault. The prescriptive recommendations may include one or more likely clues and their cause-effect relationships for the new fault, one or more users who were previously involved in finding solutions for the fault, one or more potential causes for the new fault, and one or more potential solutions for resolving the new fault. Additionally, the cause-tree/fishbone diagram creation and managing unit 208c is configured to facilitate automatic nesting and un-nesting of the fishbone diagram whenever a cause is added to or deleted from a cause hierarchy.

In an embodiment, the reporting module 210 is in communication with the database 202, the UI module 206, and the fault analysis module 208. The reporting module 210 is configured to facilitate reporting and sharing of investigation status, and tracking of key performance indicators (KPIs) for problem investigations. The reporting module 210 includes the status report generation and sharing unit 210a and the performance tracking unit 210b. The status report generation and sharing unit 210a is configured to prepare the investigation status reports based on the updates done on the symptoms table, the cause-effect graph and the cause-tree/fishbone diagram. The status report generation and sharing unit 210a is also configured to share the generated status reports with one or more users and supervisors (e.g., the supervisors 102a and 102b). The performance tracking unit 210b is configured to compile and report key performance indicators (KPIs) of an individual investigation such as fault resolution time, fault investigation team size, total number of updates from one or more investigators and the like, based in part on the updates done on the symptoms table, the cause-effect graph and the cause-tree/fishbone diagram. The performance tracking unit 210b is also configured to analyse the historical data of prior problem investigations to generate aggregated KPIs, such as mean time to resolve (MTTR), average size of investigation teams, one or more causes that contributed to faults and the like. The trends in the KPIs can be seen when they are computed over several weeks or months. For example, the MTTR for all problems investigated by the system 200 for a month of January 2020 can be computed along with an average investigation team size. The computed MTTR and the average investigation team size can be displayed to the supervisors (e.g., the supervisors 102a and 102b) and the supervisors can use this information in planning future resource allocation. The generated KPIs may also enable managers and the supervisors to easily track performance of investigation teams and effectiveness of the system 200 in reducing the MTTR, as well as to understand which causes and/or components were responsible for the problems occurring in the faulty system so that future resource allocation can be planned accordingly.

The recommendation engine 212 is in communication with the database 202, the fault analysis module 208 and the reporting module 210. The recommendation engine 212 is configured to make prescriptive recommendations for new faults using the historical data related with the resolved faults/problems stored in the database, actions facilitated by the fault analysis module 208 and the reports generated by the reporting module 210. In an embodiment, the actions facilitated by the fault analysis module 208 includes actions performed on the symptoms table, actions performed on the cause-effect graph and the actions performed on the cause-tree/fishbone diagram. The prescriptive recommendations may include one or more likely clues and their cause-effect relationships for a new fault, one or more users who are qualified to find solutions for the new fault, one or more potential causes for the new fault, and one or more potential solutions for resolving the new fault.

In at least one example embodiment, the recommendation engine 212 is configured to self-learn from the actions facilitated by the fault analysis module 208. A primary goal of self-learning is to recommend likely clues and useful actions for new problems using historical data captured for solved problems. So, whenever a symptoms table for a new problem is created by the symptom table creation and managing unit 208a based on relevant data received for investigation of a fault, the recommendation engine 212 may perform problem similarity matching and analyse data in the resulting matching problems to generate following suggestions:

Clue suggestions: suggestions for one or more symptoms those are significant or notable for analysing the new problem i.e. suggestions for one or more symptoms that are likely to be clues.

Cause-effect suggestions: suggestions for likely causality relationships between the clues i.e. a suggested cause-effect graph.

Cause suggestions: suggestions for one or more causes those are likely to be responsible for the new problem i.e. a suggested cause-tree/fishbone diagram.

Action suggestions: suggestions for one or more actions that would likely be useful and not useful in resolving the new problem.

Investigator suggestions: suggestions for one or more personnel that are likely to get the new problem resolved.

In an embodiment, for performing the problem similarity matching, the recommendation engine 212 may utilize data received from the symptoms table to identify a list of similar problems. Once the list of similar problems is obtained, the recommendation engine 212 may compare symptoms and context of the new problem against the data of solved prior problems stored in the database 202. Further, the recommendation engine 212 may generate a similarity score which is a percentage between 0 and 100 for indicating closeness of each result match. It should be noted that the algorithms for problem similarity matching do not affect the methods for generation of recommendations and any rational similarity matching/scoring algorithm that is appropriate for the faulty system can be used to identify the list of similar problems. A similarity matching algorithm that can be used to generate similarity score includes computing of individual similarity scores for the symptoms and clues defined in the symptoms table of a new problem as compared to the symptoms table of a prior solved problem, and combining these individual scores with certain weights to generate an overall similarity score. Additionally, the problems mentioned in the list of similar problems may also be ranked in order of the similarity score.

The processing module 214 is configured to coordinate with the database 202, the UI module 204, the fault data receiving module 206, the fault analysis module 208, the reporting module 210 and the recommendation engine 212 of the system 200 for operation of the various components of the system 200.

The database 202, the UI module 204, the fault data receiving module 206, the fault analysis module 208, the reporting module 210, the recommendation engine 212 and the processing module 214 may be configured to communicate with each other via or through the centralized circuit system 216. The centralized circuit system 216 may be various devices configured to, among other things, provide or enable communication between the modules (202-214) of the system 200. In certain embodiments, the centralized circuit system 216 may be a central printed circuit board (PCB) such as a motherboard, a main board, a system board, or a logic board. The centralized circuit system 216 may also, or alternatively, include other printed circuit assemblies (PCAs) or communication channel media. In some embodiments, the centralized circuit system 216 may include appropriate storage interfaces to facilitate communication among the modules (202-214). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

FIG. 3 is an example representation of a symptoms table 300 displaying problem symptoms that are likely to be relevant to the occurrence of a problem in the faulty system, in accordance with an example embodiment. Examples of the problem symptoms for a software system include "DB Connection failed", "Red light flashing", and abnormal metric reports such as "CPU usage 100%", "Memory low" etc. The abnormal patterns recorded by the monitoring tools may serve as an evidence for the problem investigation.

The symptoms table 300 includes one or more rows for describing the one or more symptoms that may have occurred in one or more modules of the faulty system and a plurality of columns for defining one or more details associated with each symptom. The one or more details include, but are not limited to, symptom identifier, symptom pattern, time of symptom occurrence, component at fault and symptom category. The one or more details may also include single-valued attributes such as category, event count and multi-valued attributes such as notes and attachments for each symptom included in the symptoms table 300. The single-valued attributes and the multi-valued attributes may hold additional information or observations for the symptom.

A symptoms table for 'website down' problem that has occurred in an e-commerce website and needs to be investigated collaboratively is shown in FIG. 3. The e-commerce application may consist of three main modules which are application module, database module, and web module. A plurality of investigators may typically be involved in the problem analysis, as people in different teams are generally responsible for different modules. Here, at least three investigators are expected to collaborate i.e., SMEs of the application, database and web modules may be required for investigating about the 'website down' problem.

As shown in the symptoms table 300, 8 specific symptoms for the 'website down' problem may have been observed and are recorded in the symptoms table 300 along with other details. The symptoms table 300 includes a symptom identifier field 302, a symptom pattern field 304, a time of event occurrence field 306, a component field 308, a symptom category field 310 and a clue field 312. The symptom identifier field 302 indicates a short label to represent the symptom. The symptom pattern field 304 represents an event that has been considered as a symptom for the fault. The time of event occurrence field 306 indicates the times at which the event has been observed. The component field 308 displays a name of the component in which the event has been observed. In an embodiment, the problem symptoms in the software systems are mainly classified into three different categories i.e. error, warning and other. It should be noted that the classification is system dependent and may vary depending on its characteristics. The symptom category field 310 displays the category in which the event falls. The clue field 312 can attain two values that is 'YES' and 'NO'. The 'YES' value indicates that the symptom is marked as significant by the investigator. The 'NO' value indicates that the symptom is not significant for the problem.

In an embodiment, clues are the symptoms that indicate notable events. There may be a plurality of symptoms associated with a failure that has occurred in the faulty system, including one that says, for e.g., 'red light flashing for hardware module A'. The symptom 'red light flashing' may be important enough to implicate the hardware module A as causing the failure, and an investigator may decide to designate this particular symptom as a clue. The clues may help in finding the potential causes behind the problem that has occurred in the faulty system. In at least one example embodiment, the users (e.g., the investigators) can pin, i.e., post the clues on the cause-effect user interface facilitated by the collaborative problem investigation platform 116 to form the cause effect graph to determine the cause-effect relationships between the clues relevant for the problem, and can also pin them to causes in the cause-tree/fishbone diagram for evidence-based problem analysis. An example of cause-effect graph prepared for the 'website down' problem is explained in detail with reference to FIG. 5.

As shown in the FIG. 3, the 'application' module has encountered three symptoms which are identified by 'A1', 'A2' and 'A3', of which 'A1' and 'A2' are categorized as 'Error' and 'A3' is categorized as 'Other'. The symptom pattern for A1 is 'DB connection failed'. The time(s) of occurrence of the symptom is important in understanding how the events unfolded leading to the problem, and for A1 the last occurrence time is specified as '2018-11-15 16:09:19 UTC'. As another example, consider the last row in the symptoms table 300. A symptom identified by W2 that has been observed in the 'web' module, specified to be of type 'Other' with the event being '404 File not found', happened at two different times. The symptoms identified by A1, A2, D1, D2, and W1 have all been marked as clues to indicate that these symptoms are notable events and are significant for both the cause-effect analysis and the cause analysis to identify one or more modules which are responsible for creating the "Website down" problem.

In at least one example embodiment, the symptoms table 300 shown for the "Website down" problem may not be a final symptoms table as symptoms indicative of the problem are collected gradually as the investigators analyze the problem and check for underlying errors and all the symptoms are not expected to be available all at once. The symptoms table is therefore expected to get dynamically populated and updated as the problem investigation proceeds.

Figure 4:
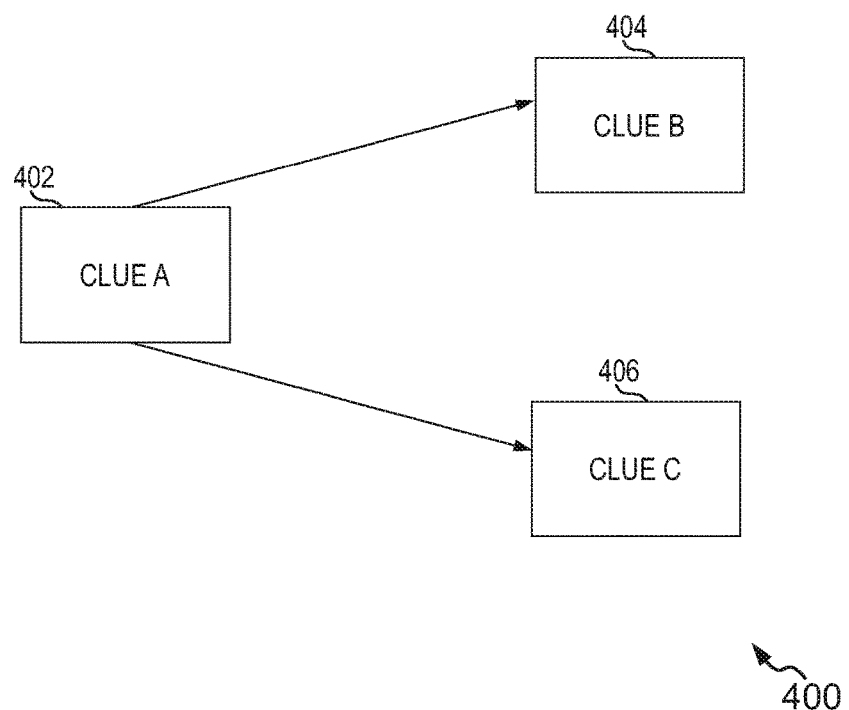
FIG. 4 is an example representation of a cause-effect graph, in accordance with an example embodiment.

FIG. 4 is an example representation of a cause-effect graph 400, in accordance with an example embodiment. The cause-effect graph 400 is created by the users (e.g., the investigators 106a to 106n) of the collaborative problem investigation platform 116 on the cause-effect user interface facilitated by the collaborative problem investigation platform 116 for determining cause-effect relationships between the clues determined for a problem.

The cause-effect graph 400 includes three nodes 402, 404 and 406. The nodes 402, 404 and 406 correspond to the clues A, B and C, respectively for the problem being investigated. As shown in FIG. 4, the node 402 is connected to the nodes 404 and 406 through two directed arrows to indicate that at least one event in the clue A has happened earlier in time than the events in clues B and C and there is a cause-effect relationship between the clues A and B, and the clues A and C.

In an embodiment, the cause-effect graph 400 shown for the problem may not be an updated cause-effect graph as the updated cause-effect graph is generated when the updated cause-effect relationships between the clues relevant for the problem are determined. As the problem investigation proceeds, the cause-effect graph is concurrently updated by the plurality of users and the causal relationships are determined between the clues. These relationships may further be subjected to change as the analysis evolves. So, at the end of the analysis only, we may get the updated cause-effect graph and the updated cause-effect relationships between the clues.

Figure 5:
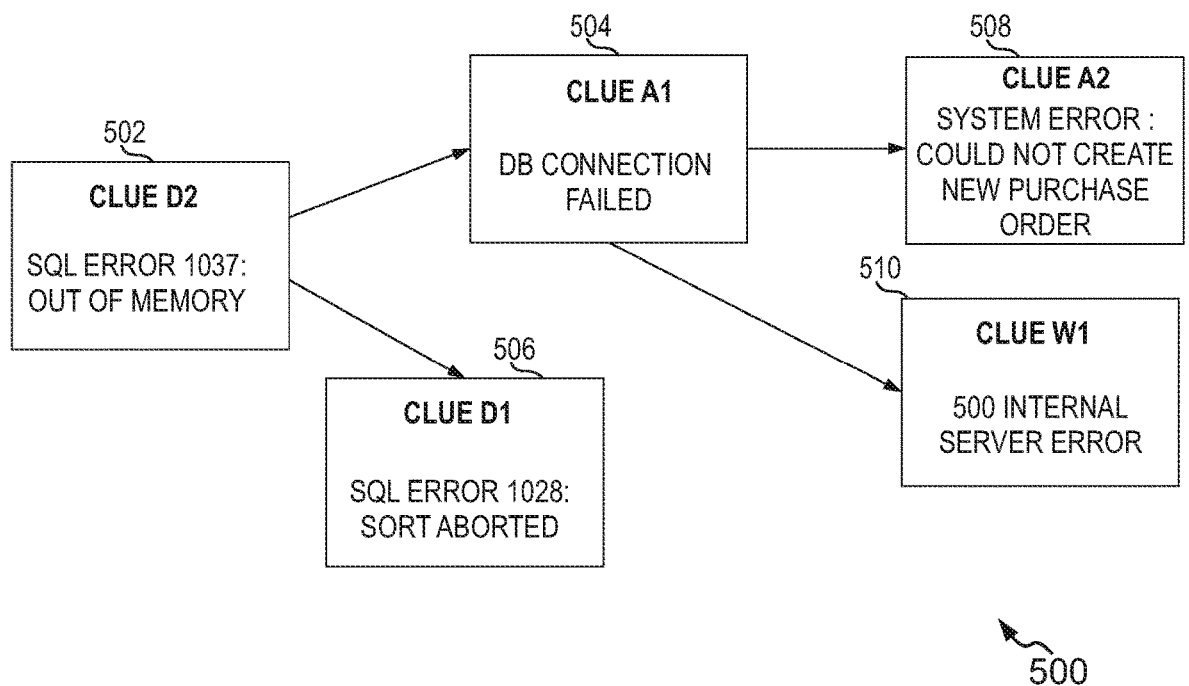
FIG. 5 is an example representation of the cause-effect graph, in accordance with another example embodiment.

FIG. 5 is an example representation of a cause-effect graph 500, in accordance with another example embodiment. The cause-effect graph 500 is example cause-effect graph for the 'website down' issue occurring in the e-commerce website as discussed with reference to FIG. 3. The cause-effect graph 500 is prepared based on the symptoms table 300 with reference to FIG. 3.

As described with reference to FIG. 3, the symptoms identified by A1, A2, D1, D2, and W1 have all been marked as clues in the symptoms table 300 to indicate that these symptoms are notable events and are significant for the cause-effect analysis. So, the cause-effect graph 500 includes nodes 502, 504, 506, 508 and 510 corresponding to the clues identified by D2, A1, D1, A2, and W1, respectively. The node 502 is shown to be connected to the nodes 504 and 506 through directed arrows indicating that the error in clue D2 is responsible for causing the errors in clues A1 and D1. Similarly, node 504 is further shown to be connected to the nodes 508 and 510 through directed arrows indicating that the error in clue A1 is responsible for causing the errors in clues A2 and W1.

Figure 6:
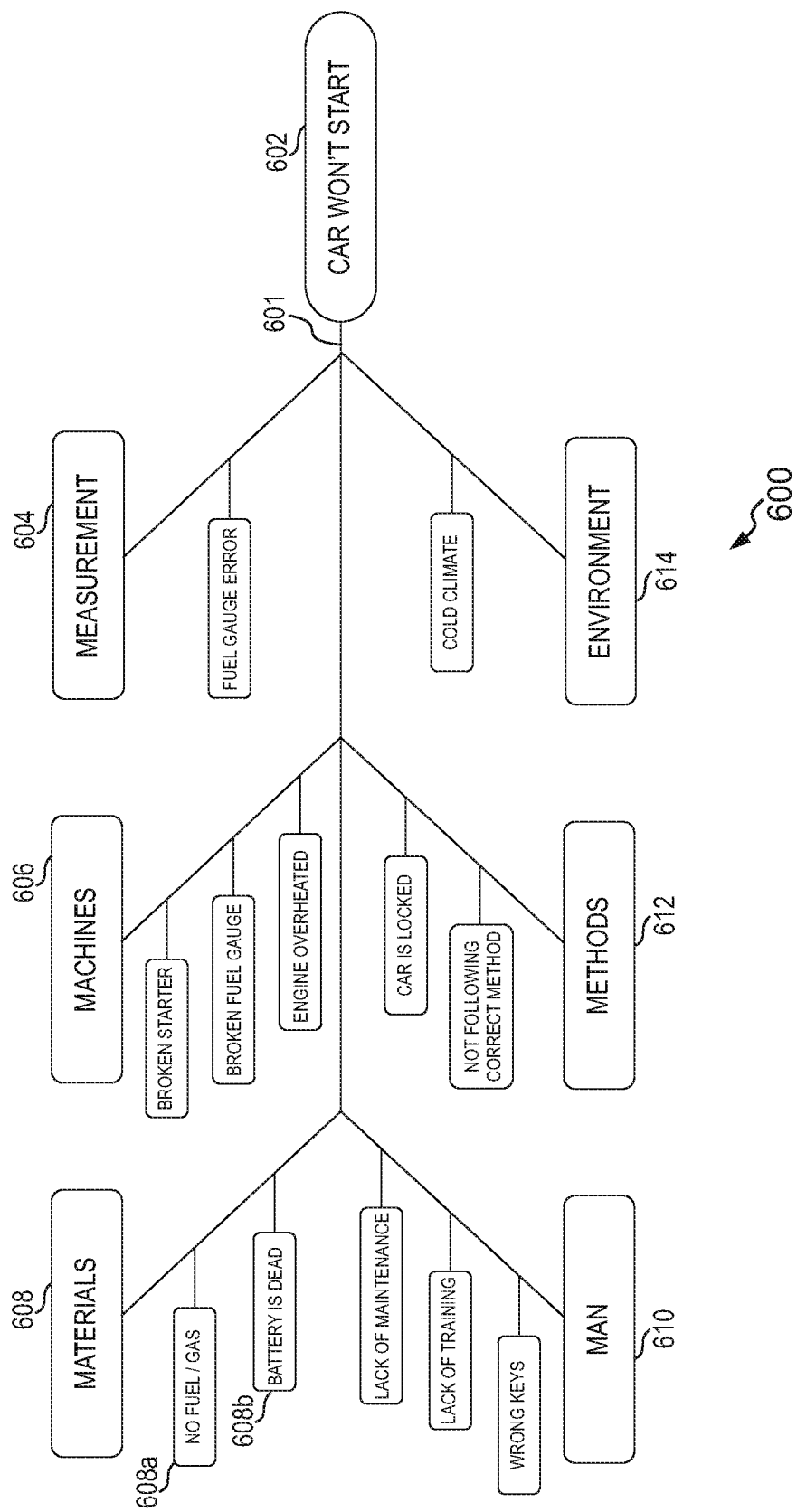
FIG. 6 is an example representation of a fishbone diagram, in accordance with an example embodiment.

FIG. 6 is an example representation of a fishbone diagram 600 displayed to the users (e.g., the investigators 106a to 106n) on their electronic devices while performing problem investigation using the collaborative problem investigation platform 116, in accordance with an example embodiment. The fishbone diagram 600 may be used by the users of the collaborative problem investigation platform 116 for identifying potential causes for the problem 'car won't start'.

As shown in FIG. 6, a head 602 of the fishbone diagram 600 includes short problem description i.e. 'Car won't start', and a plurality of causes 604 to 614 are represented as bones on a spine 601. In an embodiment, the causes may represent independent modules or external issues of the faulty system ('car' in present example scenario). So, the causes 604 to 614 for the fault occurring in the car include independent modules and external issues such as 'measurement', 'machines', 'materials', 'man', 'methods' and 'environment'. The causes 604 to 614 are further split into children sub-causes for independent analysis of each sub-module of each module or each sub-cause of each external issue.

A cause 608 corresponding to 'materials' module includes sub-modules 608a and 608b corresponding 'no fuel/gas' and 'battery is dead' sub-causes, respectively. One or more attributes may be associated to each sub-cause of each cause and each cause to have a structured framework for holding data such as notes, priorities and deadlines for each individual cause to enable efficient in-context collaboration. The plurality of attributes associated to causes is discussed in detail with reference to FIG. 8. In an embodiment, one or more symptoms as well as an actions list may be associated to a cause of the plurality of causes to support human decision-making and evidence-based cause analysis/root cause analysis, and for self-learning to generate prescriptive recommendations for new problems. The actions list may include actions that may have been taken, are being taken now, or are planned to be taken during the investigation process. Typically, actions taken during the analysis phase are investigative in nature, such as 'Check fuel gauge' or 'Analyze DB log'. If a cause is suspected or confirmed to be at fault, the actions may include fixes or workarounds for the problem, such as 'Recharge battery' or 'Reboot database'. The actions may have details associated with them, such as the purpose, (planned) start time and (expected) end time, whether the action worked as expected or not (for self-learning), what components they impacted etc. In at least one example embodiment, the action categories may be pre-defined for the faulty system under consideration as fixed categories may enable better self-learning to generate useful recommendations for new problems. The users can select any action from this pre-defined set of action categories, and add their own details as needed. For example, for an IT application, the allowed action types could be 'Upgrade memory', 'Reboot server', 'Restart application' and so on.

In an embodiment, a nested fishbone diagram may be created automatically for deep or bushy cause-trees with drill-downs for easy hierarchical visualization. The nested fishbone diagram is discussed in detail with reference to FIG. 7A.

Figure 7A:
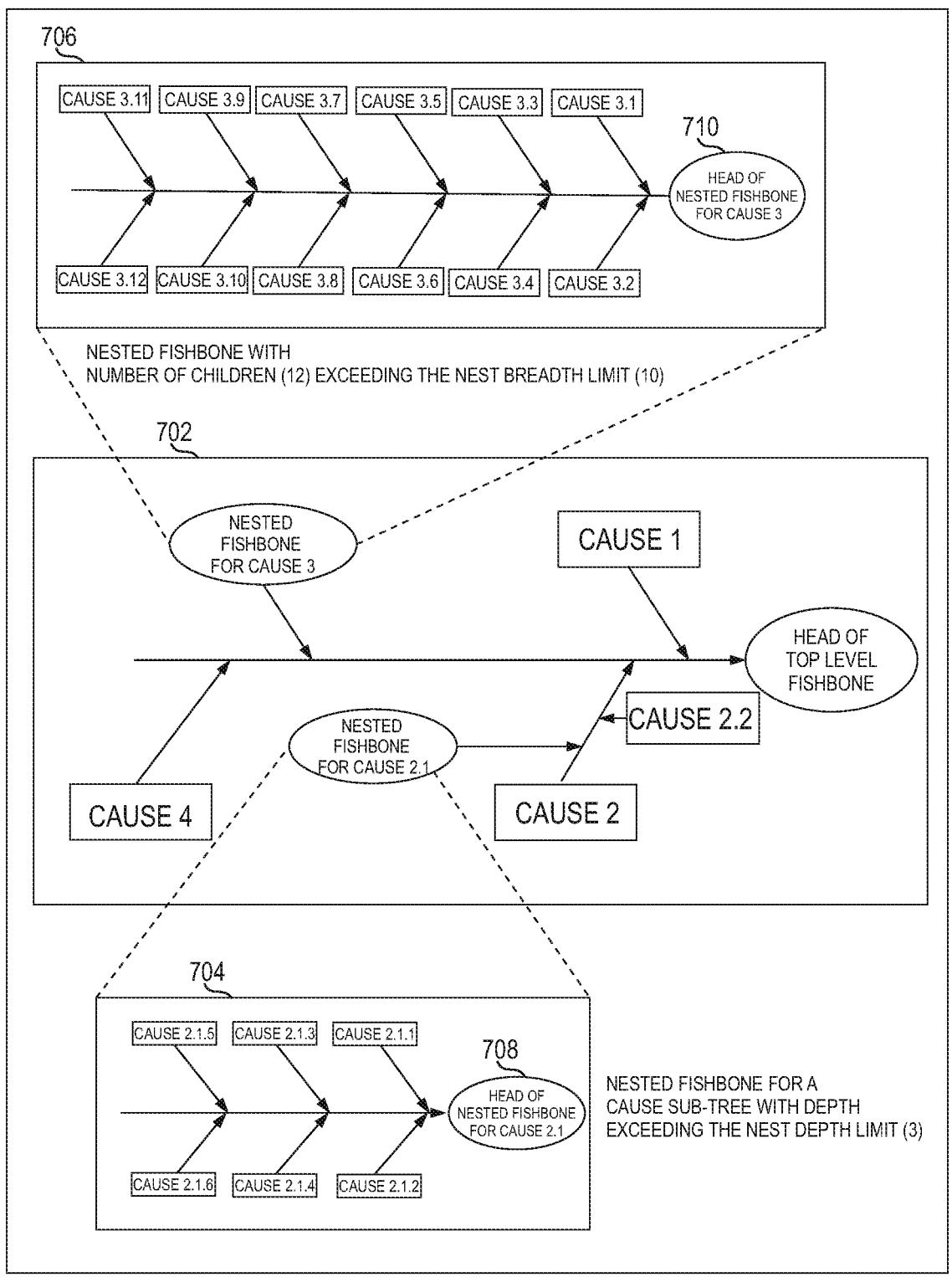
FIG. 7A is an example representation of a nested fishbone diagram, in accordance with an example embodiment.

FIG. 7A is an example representation 700 of a nested fishbone diagram, in accordance with an example embodiment. The nested fishbone diagram is created for complex problems that are investigated by different teams, and in which the cause tree hierarchy is quite deep or bushy making it difficult to visually represent and comprehend in a single large fishbone diagram with many causes. In the nested fishbone diagram, a cause in the fishbone diagram can be a sub-fishbone that is embedded within its parent fishbone. The nesting of fishbone diagram to arbitrary depths is very useful for visualizing modular investigations by different teams that may proceed in parallel but finally all tie in together to identify the potential causes for the problem. The nested fishbone diagram may also reduce the complexity visible at the top-level fishbone diagram, which is referred to as the main fishbone diagram.

As shown in FIG. 7A, a cause 2.1 is a sub-fishbone 704 corresponding to a sub-cause and is embedded within a parent fishbone/top-level fishbone 702. Similarly, a cause 3 is sub-fishbone 706 embedded within the parent fishbone 702. The sub-fishbone 704 includes a head 708 that may comprise short sub-cause description, and a plurality of sub-causes, such as a cause 2.1.1, a cause 2.1.2, a cause 2.1.3, a cause 2.1.4, a cause 2.1.5, and a cause 2.1.6 represented as bones on a spine of the sub-fishbone 704. The sub-fishbone 706 includes a head 710 that may comprise short cause description, and a plurality of sub-causes, such as a cause 3.1, a cause 3.2, a cause 3.3, a cause 3.4, a cause 3.5, a cause 3.6, a cause 3.7, a cause 3.8, a cause 3.9, a cause 3.10, a cause 3.11, and a cause 3.12 represented as bones on the spine of the sub-fishbone 706. The nesting of the fishbone may provide clearer visual representation of complex cause hierarchies, such as of causes 2.1 and cause 3 as each of the sub-fishbones 704 and 706 only deals with a small section of the parent fishbone 702.

Figure 7B:
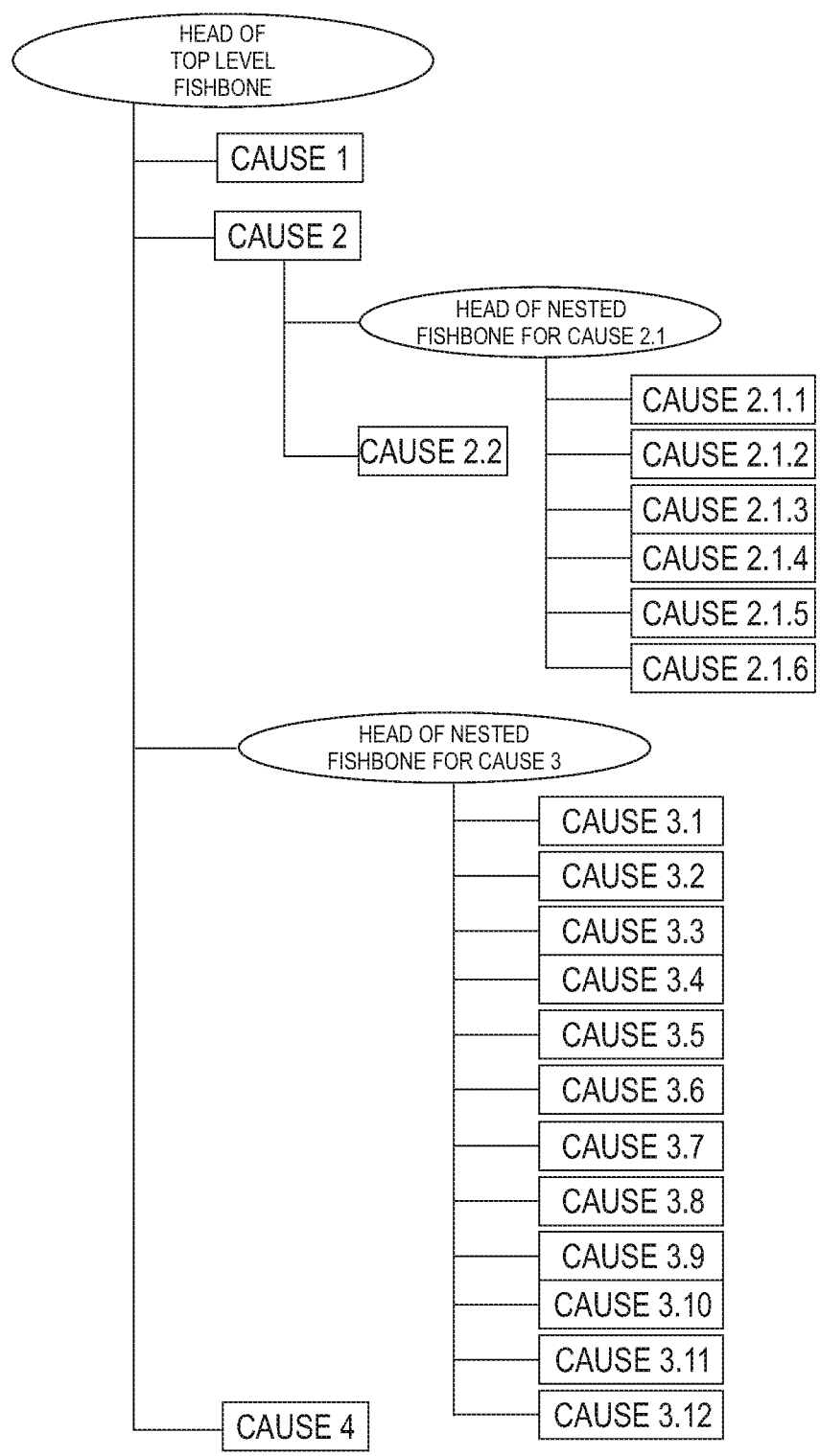
FIG. 7B is an example representation of a cause-tree of the nested fishbone diagram, in accordance with an example embodiment.

In an embodiment, nesting and un-nesting of the fishbone diagram may automatically be performed by the collaborative problem investigation platform 116 based on a nest depth limit and a nest breath limit set by an administrator of the collaborative problem investigation platform 116. In at least one example embodiment, the nesting of the fishbone diagram is performed when a cause with many descendants or many sub-causes are added to the fishbone diagram. For example, a cause with many descendants (deep hierarchy) and/or many sub-causes (overly bushy tree) are automatically nested after the nest depth limit and the nest breath limit are passed. Then, the nested cause becomes the head of a sub-fishbone, along with all its descendants and it is visually depicted on its parent fishbone as being the head of the nested fishbone. A cause-tree diagram created for the nested fishbone diagram is shown in a representation 750 of FIG. 7B.

In at least one example embodiment, the un-nesting of the fishbone diagram is automatically performed when a cause or a sub-cause is deleted from the fishbone diagram making it less deep or less bushy as compared to the nest depth limit or nest breadth limit set for the fishbone diagram.

FIG. 8 is an example representation of a table 800 depicting the one or more attributes that can be associated with a cause in the cause-tree/fishbone diagram, in accordance with an example embodiment. Each cause in the cause tree/fishbone diagram may have certain attributes associated with it to help with systematic evidence-based cause analysis during investigation by the users. The attributes may contain various pieces of investigative information that are created or decided upon as the problem analysis proceeds. The attribute can be one of two types i.e. either single-valued attribute or multi-valued attribute. The single-valued attribute can have only one value at a time. The multi-valued attribute may have one or more elements at a time. In multi-valued attributes, elements may be appended to a list or existing elements may be updated or removed.

The table 800 includes an attribute field 802, a type field 804, a description field 806 and an example field 808. A column associated with the attribute field 802 lists the one or more attributes that can be associated with the cause in the cause-tree/fishbone diagram. The one or more attributes includes, but is not limited to, name, category, deadline, fault status, priority, notes, attachments, actions, assigned-to and pinned symptoms. The types of the attributes i.e. whether the attribute is single-valued attribute or multi-valued attribute is listed under the type field 804. In an embodiment, the type of the attribute may determine the concurrency control model for simultaneous updates to that attribute by the plurality of users. The description field 806 provides the details about purpose of the corresponding attribute. The example field 808 lists an example of a value that the corresponding attribute can take.

A row 810 of the table 800 shows an attribute 'Fault status' as a 'single-valued attribute' which displays the outcome of the fault analysis of the cause to which the attribute is associated with and the outcome of the fault analysis may change during the problem analysis process. The example of a value that the 'Fault status' attribute can take is 'Not at fault'.

The last attribute 'Pinned Symptoms' in table 800 indicates symptoms/clues which have been associated by the problem investigators to a cause. The symptoms/clues association may be done by listing one or more symptom identifiers from the symptoms table (as shown in FIG. 3) in the multi-valued attribute 'pinned symptoms' of the cause. The association of a set of symptoms to a cause in this manner may establish an evidence for either suspecting or clearing that cause for the problem. The evidence may be used in the cause analysis of the current problem, and the evidence may also be reused later for cause analysis of problems where similar symptoms are seen. This 'linking' or association of symptoms to causes may enable evidence-based cause analysis and self-learning for expediting the resolution of future problems.

FIG. 9 is an example representation of a table 900 depicting a plurality of values that the fault-status attribute associated with the cause can take in the cause-tree/fishbone diagram, in accordance with an example embodiment. The 'fault-status' attribute of the cause is used to indicate an expected or confirmed outcome of failure analysis for that cause. In an embodiment, the fault status includes a fault status value. The fault status value for the fault status includes one of 'Not Relevant', 'Likely Not relevant', 'Not At Fault', 'Likely Not At Fault', 'At Fault', 'Likely At Fault', and 'Unknown'.

When the problem investigation starts, the fault status of the cause is 'Unknown', as at the start it is yet to be subjected to analysis. As the investigation proceeds, the fault status of the cause may be set to any other value at any time. In an embodiment, 'Likely At Fault', 'Likely Not At Fault' and 'Likely Not Relevant' values denote expected outcomes that are yet to be confirmed. The values indicate uncertain results that need to be confirmed but they are nonetheless very useful for team members and managers in making decisions as to where an ongoing investigation should focus.

In at least one example embodiment, 'At Fault', 'Not At Fault' and 'Not Relevant' denote confirmed outcomes from the fault analysis for that cause. However, in real-life situations, the fault status reversals are quite common even if confirmed and such reversals are fully allowed in collaborative problem investigation platform 116. For example, preliminary investigation may lead to setting of the fault status of the 'Database' cause as 'At Fault', only to be reversed when further information is analyzed by problem investigators.

The description of the fault status values and their intended usage in the problem analysis process is shown in table 900. The table 900 includes a fault status of potential cause field 902, a description of the fault status field 904, an interpretation in problem analysis field 906, a weight field 908 and an indicative color field 910. A column associated with the fault status of potential cause field 902 lists the fault status values that a fault-status can take in the cause-tree/fishbone diagram. The description of the fault status value i.e. what that fault status value indicates is listed under the description of the fault status field 904. What should be interpreted from the corresponding fault status value is listed under the interpretation in problem analysis field 906. The weight field 908 lists an order of precedence/a fault status weight for the corresponding fault status value. The indicative color field 910 indicates a color that may be used to represent the corresponding fault status value.

As shown in FIG. 9, the fault status 'At Fault' has the highest weight/precedence i.e. '6' and the fault status 'Not Relevant' has the lowest weight i.e. '0'. The weights establish a precedence ordering that may be utilized for consistency checking and for automatic fault status propagation in the cause-tree/fishbone diagram.

The weights in the collaborative problem investigation platform 116 are designed to facilitate systematic hierarchical cause exploration during a problem investigation. The goal of the problem investigation is to identify one or more causes that are at fault. The causes may be located anywhere in a cause-tree hierarchy. Intuitively, a cause cannot be cleared as 'Not At fault' until and unless all its descendant sub-causes have been cleared as 'Not At Fault' or 'Not Relevant'. Conversely, a cause is 'At Fault' if ANY of its descendant sub-causes is at fault. The expected outcomes 'Likely At Fault', 'Likely Not At Fault', and 'Likely Not Relevant' for the fault status of a cause denote intermediate outcomes that are yet to be confirmed, but they still can be used to establish a meaningful fault status for parent and ancestors of that cause, which may aid in decision-making during the problem investigation process.

In an embodiment, the weights assigned to the fault statuses in the collaborative problem investigation platform 116 lead to a predefined precedence rules that are employed for automatic fault status propagation and fault status consistency checking in the cause-tree/fishbone diagram. For example, setting an 'At Fault' outcome for a cause automatically propagates all the way up the tree to all its parent and ancestor causes. The consistency rule and the resulting propagation scheme are explained in detail with reference to FIG. 11.

Figure 10:
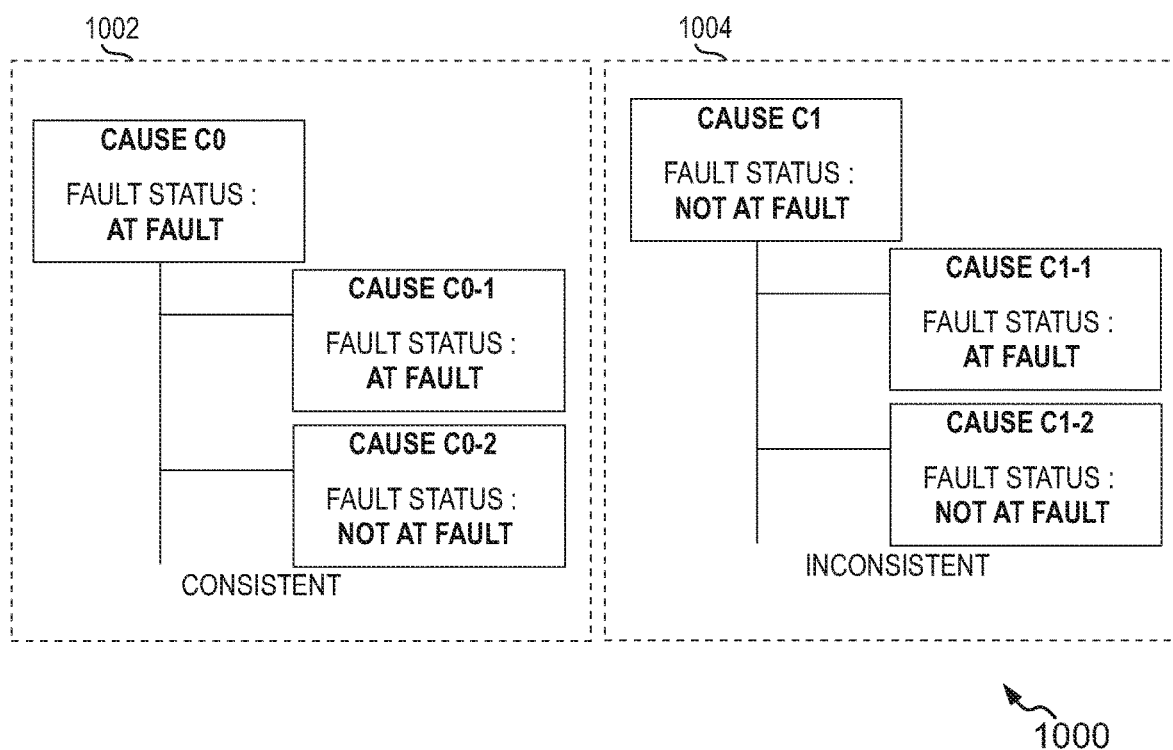
FIG. 10 is a schematic representation of a consistent and an inconsistent cause hierarchy, in accordance with an example embodiment.

FIG. 10 is a schematic representation 1000 of a consistent and an inconsistent cause hierarchy, in accordance with an example embodiment. The representation 1000 includes a consistent cause hierarchy 1002 and an inconsistent cause hierarchy 1004.

As shown in FIG. 10, a fault status value of a sub-cause 'C0-1' of a cause 'C0' in the consistent cause hierarchy 1002 is at fault and the fault status value of the other sub-cause 'C0-2' of the cause 'C0' is not at fault. So, the fault status value of the cause 'C0' is at fault as the fault status value of the sub-cause 'C0-1' is at fault. The inconsistent cause hierarchy 1004 also includes two sub-causes 'C1-1' and 'C1-2' for a cause 'C1'. The fault status value of the sub-cause 'C1-1' is shown to be at fault, the fault status value of the sub-cause 'C1-2' is shown to be not at fault, and the fault status value of the cause 'C1' is shown to be not at fault which is not possible as the fault status value of the sub-cause 'C1-1' is at fault. Therefore, the cause hierarchy 1004 is considered as inconsistent.

FIG. 11 is an example representation of a fault-status consistency matrix 1100 for the fault status value of the fault status of the causes in the cause-tree/fishbone diagram, in accordance with an example embodiment. The fault status value in the cause-tree/fishbone diagram needs to be consistent, which means that the various causes in the hierarchy must have fault outcomes that do not conflict with each other. For example, if a child cause in the cause tree hierarchy has the fault status value 'At Fault' then the fault status value of the parent cause cannot be 'Not at Fault', and intuitively parent and all ancestors are expected to be 'At Fault' also. A consistency rule that is followed by the collaborative problem investigation platform 116 is explained below Consistency Rule: A cause-tree/fishbone diagram with a hierarchy of potential causes is defined as 'Consistent' at a given point of time if and only if it satisfies the following condition: Every cause in the cause-tree hierarchy must have a fault status value that is equal to or greater than that of any of its descendants.

The above consistency rule implies that a parent cause can have fault status higher than its children and/or descendants, but the reverse is not allowed. For example, in a cause-tree that has a cause set to the fault status of 'At Fault', the parent and other ancestors of that cause must also have 'At Fault' statuses. The effect of this consistency rule in the cause-tree/fishbone diagram is summarized in the consistency matrix 1100.

As shown in the consistency matrix 1100, columns indicate various fault status values for a parent cause, and rows indicate various fault status values for any child of this parent cause.

In an embodiment, the fault status of any cause in the cause-tree can be manually set by the users of the collaborative problem investigation platform 116 at any time. The collaborative problem investigation platform 116 may automatically execute a fault status propagation algorithm when a user manually sets the fault status of any cause to ensure that the cause-tree/fishbone diagram is always in a consistent state as per consistency matrix 1100. The fault status update and propagation rules defined in the fault status propagation algorithm are explained below:

On update of the fault status of a cause, check that the cause-tree would not become inconsistent by the current update, as per the rules stated in consistency matrix 1100.

If the fault status update would cause the cause-tree to be inconsistent, then

Inform the user that the update would make the cause-tree inconsistent

Suggest additional remedial steps to preserve the consistency, e.g., by adding a new child cause with appropriate fault status cause under the parent cause.

If the fault status update would preserve the consistency of the cause-tree, then Inform the user that the fault status update is accepted, and Automatically propagate the update to the parent and ancestor causes in the cause-tree by recursively re-computing their fault status values using a formula mentioned below:

Fault status (weight) of a parent cause=Maximum of the weights of all its children/descendant causes In at least one example embodiment, the fault status value of the fault status of any cause can be manually set by investigators in the collaborative problem investigation platform 116, and the fault status value may be automatically propagated using the above rules. The fault status value of any parent cause is determined during automatic propagation by the maximum value of the weights of the fault status value of all its children (if any), using the weights shown in table 900.

Figure 12:
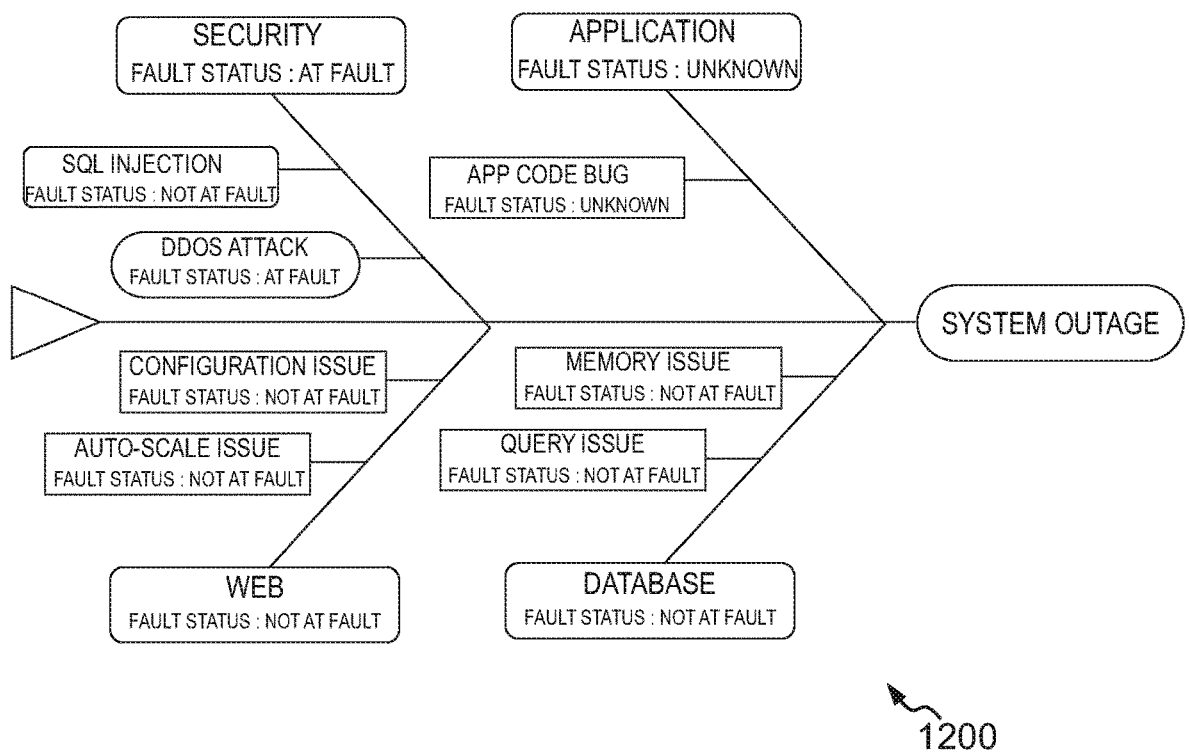
FIG. 12 is an example representation of a fishbone diagram, in accordance with another example embodiment.

FIG. 12 is an example representation of a fishbone diagram 1200 displayed to the users (e.g., the investigators 106a to 106n) on their electronic devices while performing problem investigation using the collaborative problem investigation platform 116, in accordance with another example embodiment. The fishbone diagram 1200 may be used by the users of the collaborative problem investigation platform 116 for identifying potential causes for the problem 'system outage' which is shown in a head of the fishbone diagram 1200.

As shown in FIG. 12, four potential main causes for the problem system outage can be 'Application', 'Database', 'Security' & 'Web'. Sub-causes within each of the main causes may help break down the main causes into their constituent parts so that the user can explore them systematically. For example, the 'Database' cause is broken down into 'Memory Issue' or 'Query Issue', each of which may be individually analyzed by the users (e.g., the investigators 106a to 106n). Likewise, the 'Security' cause may be due to one of 'SQL Injection' or 'DDOS Attack', the latter being a nested Fishbone (the details of which are not shown in FIG. 12).

In the fishbone diagram 1200, the cause 'DDOS Attack' has been found to be at fault, which is indicated by its fault status value being set to 'At Fault'. Being of the highest precedence as described in table 900, the fault status has been propagated to its parent cause 'Security'. Fault status of both the sub-causes 'Memory Issue' and 'Query Issue' for the cause 'Database' have been set to 'Not At Fault' and this fault status is propagated to the parent 'Database' cause. Likewise, the fault status of the 'Web' cause has been set to 'Not At Fault', based on the same fault status values of both of its children which are 'Not At Fault'. The 'App Code Bug' sub-cause of the 'Application' cause remains unexplored, so its fault status is set to 'Unknown'.

In an embodiment, the cause-tree/fishbone diagram may have zero, one or more symptoms or clues associated to it from the symptoms table. One symptom or clue may be associated with one or more causes. The association is essentially a many-to-many relationship between the set of causes and the set of symptoms which enables the users to clearly indicate how the symptoms are related to the causes using the cause-tree/fishbone diagram. The cause and symptom association information is useful for shared understanding and human decision-making during problem investigations, and is also used internally by the system 200 for self-learning to generate recommendations in future.

FIG. 13 is an example representation of a table 1300 depicting concurrency model for operations on a symptoms table (e.g., the symptoms table 300 shown in FIG. 3), in accordance with an example embodiment. The symptoms table is concurrently readable and updatable by the plurality of users. The collaborative problem investigation platform 116 supports fine-grained concurrent operations on the symptoms table by the plurality of users (e.g., the investigators 106a to 106n) working together on a same problem. The functionality of concurrent operations on the symptoms table may require a concurrency model to be defined within and across concurrently updatable entities of the symptoms table, including conflict detection and notification if two or more concurrent updates are incompatible or even if they appear to conflict with each other. The concurrent operations that can be performed on the symptoms table include addition, deletion, and update of symptoms, as well as the addition, deletion or update of notes, attachments and other attributes for a specific symptom. A symptom may have single-valued attributes such as category, event count, and clue status indication (whether it is a clue or not), as well as multi-valued attributes such as notes and attachments. The plurality of users may update one or more symptoms and their attributes, and a fine-grained concurrency model is defined in the system 200 for that purpose.

In an embodiment, the collaborative problem investigation platform 116 employs the fine-grained concurrency model to handle simultaneous updates on the symptoms table while maintaining the integrity of the symptoms table as a whole. In the fine-grained concurrency model, concurrent additions and deletions of different symptoms in the symptoms table will not conflict. However, if one user is updating a symptom or an attribute of a symptom while another user deletes it at around the same time, then there could be a conflict depending on the timing of the updates. The fine-grained concurrency model is explained in the table 1300.

The table 1300 includes a concurrent operation field 1302, an example field 1304, and an outcome field 1306. A column associated with the concurrent operation field 1302 lists the concurrent operations that may be performed on the symptoms table. An example of the concurrent operations that can be performed is provided in the example field 1304. The output of the concurrent operations when the concurrent operation listed in the concurrent operation field 1302 is performed is listed in the outcome field 1306.

FIG. 14 is an example representation of a table 1400 depicting concurrency model for operations on a cause-effect graph (e.g., the cause-effect graph 500 shown in FIG. 5), in accordance with an example embodiment. The cause-effect graph is concurrently readable and updatable by the plurality of users. The collaborative problem investigation platform 116 supports fine-grained concurrent operations on the symptoms table by the plurality of users (e.g., the investigators 106a to 106n) working together on a same problem. The functionality of concurrent operations on the cause-effect graph may require a concurrency model to be defined within and across concurrently updatable entities of the cause-effect graph, including conflict detection and notification if two or more concurrent updates are incompatible or even if they appear to conflict with each other. Additionally, concurrent delete operations on the symptoms table may also affect the cause-effect graph.

The concurrent operations that can be performed on or interact with the cause-effect graph include:

- pinning a symptom on the cause-effect graph, which creates a node in the graph for the symptom
- unpinning a symptom/clue, which removes the node for that symptom from the graph
- connecting a pair of symptoms/clues on the graph with cause-effect arrows to indicate causality
- disconnecting a pair of symptoms/clues on the cause-effect graph that are connected
- grouping a set of symptoms/clues on the cause-effect graph to indicate correlation
- ungrouping a set of previously grouped symptoms/clues on the cause-effect graph
- deleting a symptom pinned on the cause-effect graph from the symptoms table, which also causes the node for the symptom to be deleted from the cause-effect graph.

The plurality of users of the collaborative problem investigation platform 116 can update the information represented in the cause-effect graph. To support this concurrent usage, the system 200 supports a fine-grained optimistic concurrency model for the different operations that may be performed on the cause-effect graph. The fine-grained concurrency model is explained in the table 1400.

The table 1400 includes a concurrent operation field 1402 and an outcome field 1404. The concurrent operation field 1402 lists the concurrent operations that can be performed on the cause-effect graph. The output of the concurrent operations when the concurrent operation listed in the concurrent operation field 1402 is performed is listed in the outcome field 1404. It should be noted that the symptom that is in the pinned state can only be unpinned by other users, and cannot be re-pinned in the pinned state. Additionally, only a set of symptoms that have been grouped can be ungrouped.

FIG. 15 is an example representation of a table 1500 depicting concurrency model for addition and deletion of causes on a cause-tree/fishbone diagram (e.g., the fishbone diagram 600 shown in FIG. 6), in accordance with an example embodiment. The cause-tree/fishbone diagram is concurrently readable and updatable by the plurality of users. The collaborative problem investigation platform 116 supports fine-grained concurrent operations on the cause-tree/fishbone diagram by the plurality of users (e.g., the investigators 106a to 106n) working together on a same problem. The functionality of concurrent operations on the cause-tree/fishbone diagram may require a concurrency model to be defined within and across concurrently updatable entities of the cause-tree/fishbone diagram, including conflict detection and notification if two or more concurrent updates are incompatible or even if they appear to conflict with each other. In an embodiment, few types of simultaneous updates by different users may result in conflicts, implying that the operations could not be executed as they operated on stale data that was updated earlier by another user. Some other types of simultaneous operations may result in unexpected data which can be confusing to other users. For example, if user A deletes a cause C1 in the cause-tree/fishbone diagram while user B adds a note to the same cause C1 at about the same time, then user B's update would not succeed if the delete operation takes place first (which operation executes first depends on the processing order, which is non-deterministic for simultaneous updates done in close temporal proximity). The result of the update might appear to user B as an unexpected outcome, since user B's visualization at the time of doing the operation showed the existence of cause C1. Hence, user B needs to be notified that his/her update did not take place as intended because of concurrent overlapping activity.

The cause-tree/fishbone diagram includes a hierarchy of causes, each of which has one or more associated attributes. To support smooth real-time collaboration among the plurality of users, the cause-tree needs to be able to merge data from concurrent updates whenever possible, and flag failed updates to users as needed. Few concurrency rules for addition and deletion of causes that need to be followed are mentioned below:

- Additions of causes in the cause tree/fishbone diagram in same or different parts of the cause tree/fishbone diagram will generally succeed, unless a parent cause has been deleted before the addition could take place.
- Simultaneous deletions of causes will never interfere with each other, as the net effect will be the same even if they occur in the same sub-tree of the cause tree hierarchy. Note that a move operation on a cause can be supported by doing a deletion and an addition of that cause under the new parent.

A fine-grained optimistic concurrency model is supported by the collaborative problem investigation platform 116 for concurrent operations that may be performed on the cause-tree/fishbone diagram. The fine-grained concurrency model for addition and deletion of causes on the cause-tree/fishbone diagram is explained in the table 1500.

The table 1500 includes a concurrent operation field 1502, an example field 1504, and an outcome field 1506. A column associated with the concurrent operation field 1502 lists the concurrent addition and/or deletion operations that can be performed on the cause-tree/fishbone diagram. An example of the concurrent operations that can be performed is provided in the example field 1504. The output of the concurrent operations when the concurrent operation listed in the concurrent operation field 1502 is performed is listed in the outcome field 1506.

FIG. 16 is an example representation of a table 1600 depicting concurrency model for addition, deletion and updating of attributes of causes on a cause-tree/fishbone diagram (e.g., the fishbone diagram 600 shown in FIG. 6), in accordance with an example embodiment. An attribute associated with a cause can be a single-valued attribute such as name, category, priority, deadline, fault status etc., or a multi-valued attribute such as notes, actions, pinned symptoms and possibly others.

A fine-grained optimistic concurrency model is supported by the collaborative problem investigation platform 116 for concurrent operations that may be performed by a plurality of users on one or more attributes associated with a cause in the cause-tree/fishbone diagram. The fine-grained concurrency model for addition, deletion and updating of attributes of causes on the cause-tree/fishbone diagram is explained in the table 1600. The outcome of simultaneous updates depends on the type of the attribute, single- or multi-valued, and nature of updates.

The table 1600 includes a concurrent operation field 1602, an example field 1604, and an outcome field 1606. A column associated with the concurrent operation field 1602 lists the concurrent addition and/or deletion operations that can be performed on the attributes associated with a cause in the cause-tree/fishbone diagram. An example of the concurrent operations that can be performed is provided in the example field 1604. The output of the concurrent operations when the concurrent operation listed in the concurrent operation field 1602 is performed is listed in the outcome field 1606.

In an embodiment, the concurrent updates from the plurality of users in the collaborative problem investigation platform 116 or the system 200 may have three kinds of outcome:
1. No conflict—all operations succeed as expected, and all the updates are merged together.
2. Conflict Error—one or more updates cannot be executed due to some operation executed by another user around the same time, which made some of the updates operate on 'stale data'. Notifications of such conflicts are sent to the concerned users, and their data is auto-refreshed.
3. Overlap Warning—multiple users have updated the same piece of data at around the same time, i.e., in temporal proximity, but without conflict error. Both updates will be executed quickly in some random (non-deterministic) order by the system 200. The final result might appear to be unexpected for some users, depending on the order of execution and the time difference between the updates. Occurrence of such updates in 'close' temporal proximity will be detected by the system 200 and to avoid confusion, concerned users will be notified that the same data was recently updated by others and it may have an unexpected value.

Figure 17:
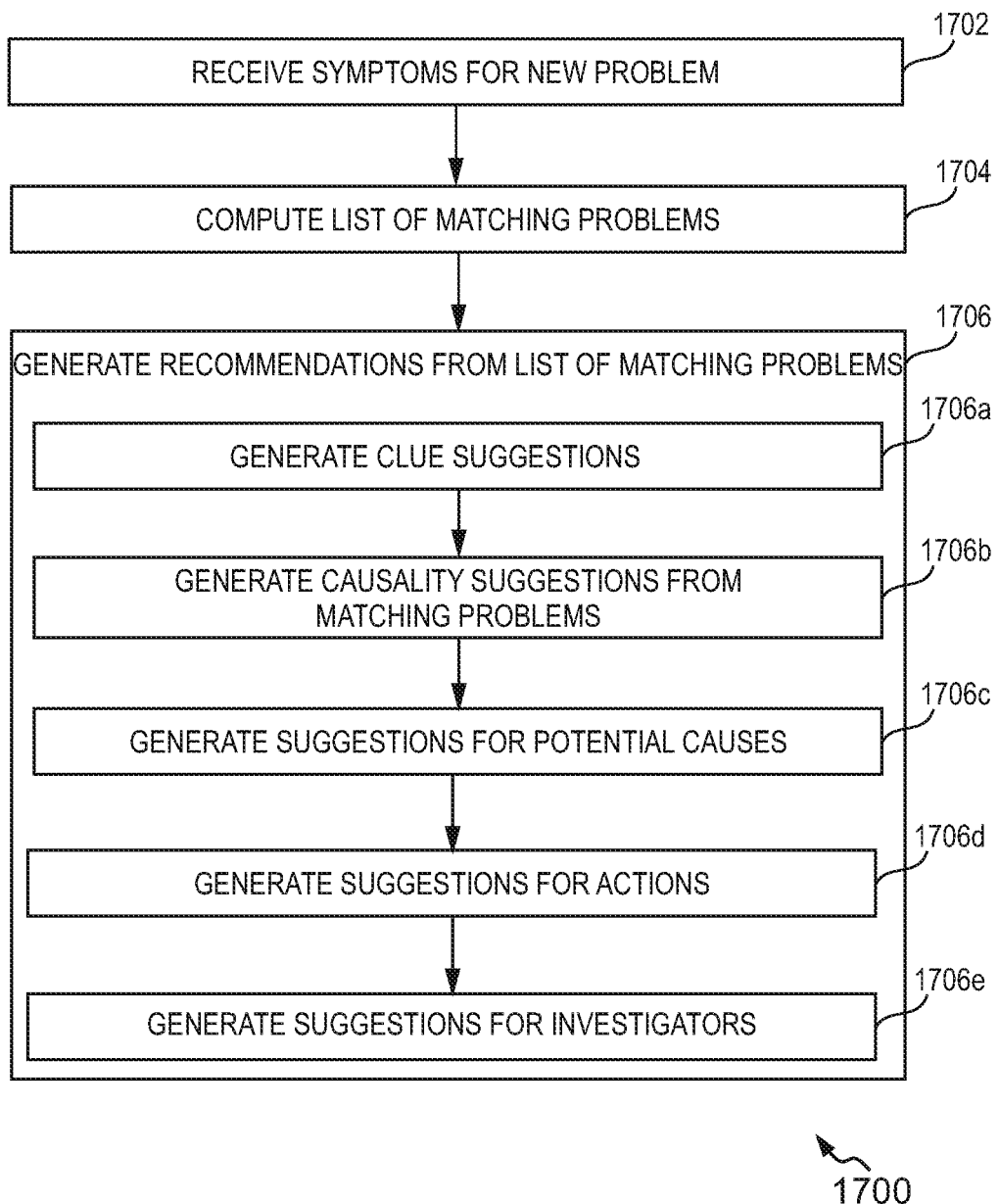
FIG. 17 is a flowchart illustrating a method for generating self-learned prescriptive recommendations for a new problem, in accordance with an example embodiment.

FIG. 17 is a flowchart illustrating a method 1700 for generating self-learned prescriptive recommendations for a new problem, in accordance with an example embodiment. The operations of the method 1700 may be carried out by a server such as the server 114, the system 200 or the electronic devices 108a to 108n. The sequence of operations of the method 1700 may not be necessarily executed in the same order as they are presented. Further, one or more operations may be grouped together and performed in form of a single step, or one operation may have several sub-steps that may be performed in parallel or in sequential manner.

At operation 1702, symptoms of a new problem ($P_{new}$) are received. The symptoms may be included in data received for one or more new faults occurring in a new faulty system. The symptoms may further be arranged in a symptoms table ($ST_{new}$) created for the new fault. In an embodiment, a symptom is a clue (i.e., a 'notable' symptom) that may or may not be identified by the users (e.g., the investigators 106a to 106n) initially for $P_{new}$. Therefore, a last column in the $ST_{new}$ which specifies if a symptom is a clue, may or may not be populated for one or more symptoms in $ST_{new}$.

At operation 1704, a list of matching problems ($M_{new}$) is computed. The list $M_{new}$ of matching problems may be created from $ST_{new}$ and historical data of prior solved problems stored in the database 118 using a problem similarity matching algorithm as discussed in FIG. 2. The list $M_{new}$ may be truncated based on an acceptable similarity match threshold which is specified as a percentage, for example, 50% indicates a 50% match with the symptoms of the new problem $P_{new}$ as computed using the similarity matching algorithms. If the similarity match threshold is set to 100% then all matching problems are retained in $M_{new}$. It should be noted that the similarity match threshold may be set in advance by the administrator of the collaborative problem investigation platform 116.

At operation 1706, prescriptive recommendations for the new problem are generated from the list of matching problems. After the list $M_{new}$ of matching problems has been computed and truncated to the specified similarity match threshold, the data in the matching problems list $M_{new}$ may be analyzed by a recommendation engine (e.g., the recommendation engine 210) to generate suggestions for the new problem $P_{new}$. The data analyzed by the recommendation engine includes a set of symptoms for the solved matching problems in $M_{new}$, their cause-effect graphs, and their cause tree/fishbone diagrams with the causes, their fault status outcomes, associated actions and users involved in resolving matching problems. The operation 1706 is a combination of operations 1706a to 1706e.

At operation 1706a, clue suggestions are generated. For each symptom S in the symptoms table $ST_{new}$ for the new problem $P_{new}$, a suggestion or confirmation is made to mark S as a clue (i.e., a notable symptom). It should be noted that the suggestion is made for S only if $ST_{new}$ does not contain specification of whether S is a clue, else if an indication is already present in the $ST_{new}$, then a check is performed to check whether S is a clue or not. The steps for making suggestion are discussed in detail below:

Step 1: Check each symptom S in $ST_{new}$ table against the set of all symptoms in the symptom tables for the matching problems present in list $M_{new}$.

Step 2: If the symptom S was always identified as a clue for all the matching problems in $M_{new}$ then suggest or confirm S as a clue.

Step 3: If the symptom S was never identified as a clue for all the matching problems in $M_{new}$ then do not suggest or confirm S as a clue.

Step 4: If in some of the problems in $M_{new}$, the symptom S was indicated to be a clue and for some of the problems it was not, then the symptom S is suggested (or confirmed) as a clue for problem $P_{new}$ or not depending on the clue suggestion threshold parameter which is specified as a percentage, say 20%. If the percentage of problems in $M_{new}$ where S was previously a clue is greater than the clue suggestion threshold, then suggest S as a clue else do not suggest or confirm S as a clue. If the clue suggestion threshold is specified as 50%, then this reduces to a simple majority rule. For example, let S1 and S2 be the two symptoms in the symptoms table STnew for a new problem Pnew, and let M1, M2 and M3 be the three matching problems for Pnew, computed using the similarity matching algorithm based on comparison of problem symptoms. Also, let the clue suggestion threshold be set to 20%. Suppose that S1 was a clue in the problem M1 and M3, but not in M2. Then S1 is suggested as a clue for the new problem Pnew, as it occurs in 2 out of 3, i.e., 66.66% of the matching problems and this percentage is greater than the clue suggestion threshold of 20%. Also, suppose that S2 was not a clue in any of the matching problems M1, M2 or M3. Then S2 is NOT suggested as a clue for the new problem Pnew.

At operation 1706b, causality suggestions are generated for the new problem Pnew from matching problems in $M_{new}$. A likely cause-effect graph $CEG_{new}$ is suggested using the symptoms specified in the new symptoms table $ST_{new}$ and the prior cause-effect graphs of the solved matching problems in the list $M_{new}$. The steps for causality suggestion are discussed in detail below:

Step 1: Let the set of symptoms in $ST_{new}$ be $\{S_1, S_2, \ldots, S_n\}$. The cause-effect graphs are needed to be examined for all the matching problems in the list $M_{new}$ to see what cause-effect relationships might hold between the symptoms $S_1, S_2, \ldots, S_n$ of the new problem $P_{new}$. Examination starts with the first symptom $S_1$ in $ST_{new}$, i.e., the symptom that occurred the earliest in time. If the time (i.e., when) information is not available, then choose any symptom in $ST_{new}$ to start with.

Step 2: Identify and suggest any relevant cause-effect relationships that were recorded in the cause-effect graphs of the matching problems $M_{new}$. To identify, first check if the symptom $S_1$ exists in the cause-effect graph $CEG_m$ for $P_m$ for every matching problem $P_m$ in the list $M_{new}$. If symptom S1 is found to exist, then compute the set of symptoms in $ST_{new}$ that are reachable from the symptom $S_1$ following single hop or multiple hop paths through directed arrows in the graph $CEG_m$. Let $Paths_{1m}$ be the set of such paths from symptom $S_1$ in the directed graph $CEG_m$ to the other symptoms present in $ST_{new}$, if they are present in $CEG_m$. The set of paths can be computed using any standard algorithm, such as breadth-first or depth-first search for the transitive closure in a directed graph. The path set computation is repeated for $S_1$ with the cause-effect graphs for all matching problems in the list $M_{new}$, and let $Paths_1$ be the union of all such paths from the symptom $S_1$ i.e.

$Paths_1$=Union of all $Paths_{1m}$ from the symptom $S_1$ to all other symptoms in $ST_{new}$, where m ranges over all matching problems in $M_{new}$.

Step 3: Process each path $P_1$ in $Paths_1$ to generate the $CEG_{new}$ graph. To generate the $CEG_{new}$ graph, following steps need to be followed:

Step 3.1: If a symptom S in the path $P_1$ is also present in the set of symptoms $\{S_1, S_2, \ldots, S_n\}$ in $ST_{new}$, then create a node for S in the $CEG_{new}$ graph if it does not already exist there else create a suggested node in the $CEG_{new}$ graph for that symptom S. It should be noted that—as per the path computation done in step 2, the first and last symptom in each path $P_1$ must also be present in the set of symptoms in $ST_{new}$ so this else condition may only come into effect for intermediate symptoms in the path $P_1$ that have not been reported in the symptoms table $ST_{new}$ for the problem $P_{new}$. The intermediate symptoms are represented as suggested nodes in the $CEG_{new}$ graph, and indicate that there may be other symptoms that are relevant for the problem $P_{new}$ but that are not in symptom set of $ST_{new}$. Such suggestions of other symptoms from the cause-effect graphs of the matching problems may be very useful for the purpose of investigating the new problem $P_{new}$.

Step 3.2: Place a directed arrow between each pair of symptoms that appears in the path $P_1$ in the order of their appearance in this path, if such an arrow does not already exist. The arrows may be to or from suggested nodes for symptoms that are not present in $ST_{new}$ but that were created by step 3.1 in $CEG_{new}$.

Figure 18:
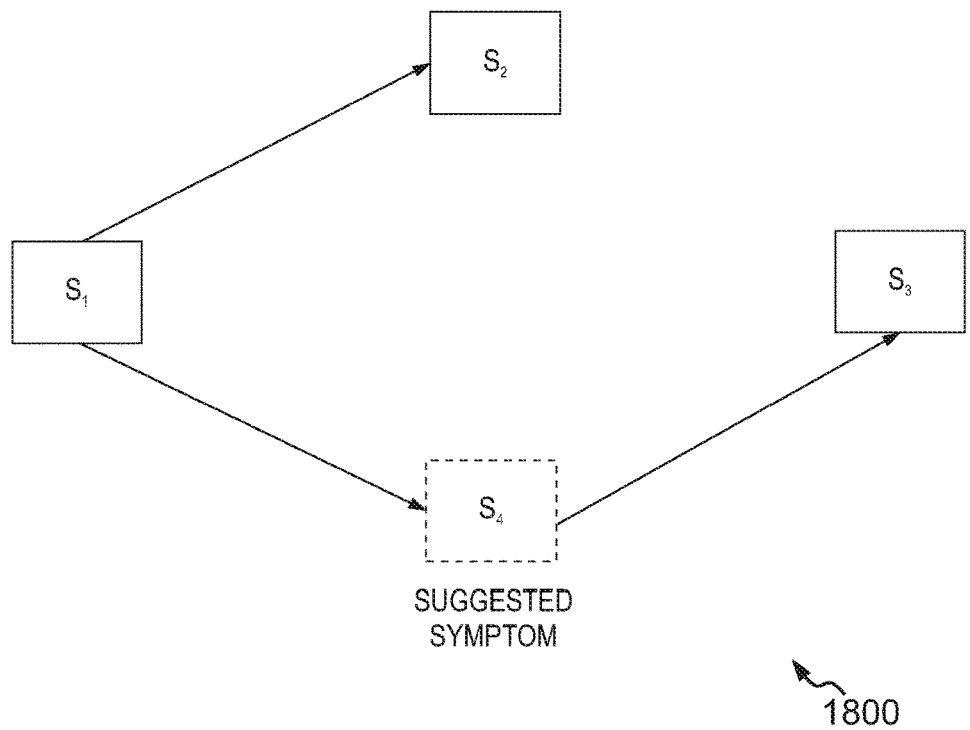
FIG. 18 is an example representation of a suggested cause-effect graph for a new problem, in accordance with an example embodiment.

Step 4: Repeat the above steps 2 and 3 for each symptom in the symptoms table $ST_{new}$, adding nodes and arrows to the graph $CEG_{new}$ as identified by these steps. The final graph $CEG_{new}$, after all the symptoms in $ST_{new}$ have been examined, is the suggested graph for the problem $P_{new}$. For example, Let $P_{new}$ be a new problem with three symptoms $S_1$, $S_2$, and $S_3$ in its symptoms table $ST_{new}$. Let $M_1$ and $M_2$ be the two prior problems that match $P_{new}$, computed using the similarity matching algorithm. Suppose that the prior problem $M_1$ had two symptoms $S_1$ and $S_2$, and the prior problem $M_2$ had three symptoms $S_1$, $S_3$, and $S_4$. The cause-effect graph for problem $M_1$ indicates that the symptom $S_1$ caused the symptom $S_2$, i.e., these two symptoms are represented as nodes in the cause-effect graph for problem $M_1$ and connected by a directed arrow which we can represent as $\{S_1->S_2\}$. The cause-effect graph for problem $M_2$ indicates that the symptom $S_1$ caused the symptom $S_4$ which in turn caused the symptom $S_3$, i.e., these symptoms are represented as nodes in the cause-effect graph for problem $M_2$ and connected by directed arrows $\{S_1->S_4, S_4->S_3\}$ between these nodes. To generate the suggested cause-effect graph for the new problem $P_{new}$, one can start with its symptom $S_1$ and compute the paths reachable from this symptom to the other symptoms $S_2$ and $S_3$. Using the step described in Step 2, from the cause-effect graph of problem $M_1$ one can infer that symptom $S_1$ may have caused the symptom $S_2$ in the new problem $P_{new}$, i.e., $\{S_1->S_2\}$ is a possible path. From the cause-effect graph of problem $M_2$ one can infer that symptom $S_1$ caused also the symptom $S_3$ through the intermediate symptom $S_4$, i.e., $\{S_1->S_4->S_3\}$ is the path to reach $S_3$ from $S_1$. Using the step described in Step 3, we add four nodes for the symptoms $S_1$, $S_2$, $S_3$ and $S_4$ to the cause-effect graph for the new problem $P_{new}$. Note that the symptom $S_4$ is not present in the symptoms table $ST_{new}$ for the new problem $P_{new}$, so it is a suggested symptom. A directed arrow is placed from $S_1$ to $S_2$ (based on problem $M_1$), and from $S_1$ to $S_4$ and $S_4$ to $S_3$ (based on problem $M_2$), to reflect the possible paths identified from the cause-effect graphs of the matching problems. The symptoms $S_2$ and $S_3$ in the symptoms table $ST_{new}$ also need to be examined, however they do not add any new nodes or connections based on the data in the matching problems $M_1$ and $M_2$. Hence, the method execution is done and the suggested cause-effect graph that is constructed for the new problem $P_{new}$, is shown in a representation 1800 of FIG. 18.

At operation 1706c, suggestions for potential causes are generated for the new problem Pnew. The most likely cause and a likely cause-tree/fishbone diagram which shows the causes likely to be potential causes for $P_{new}$ is generated for the new problem $P_{new}$ with symptoms table $ST_{new}$. The steps for potential cause suggestion are discussed in detail below:

Step 1: For each matching problem $P_m$ in the list $M_{new}$, examine the cause-tree/fishbone diagram for $P_m$ and identify the 'At Fault' (i.e., red) paths with a chain of causes and sub-causes as 1) a single 'At Fault' (red) path, if there is only one 'At Fault' (red) path in the cause tree 2) a set of 'At Fault' (red) paths in the cause-tree, if there are multiple red paths present.

Step 2: Collect all the red paths from all matching problems in $M_{new}$ and then rank the unique red paths (single paths or sets of paths) according to their frequency of occurrence. Let the ranked list of potential cause paths or sets of cause paths along with their frequency counts be called $C_{new}$. Suggest the top ranked item in $C_{new}$ as the most likely causes for the problem $P_{new}$.

Figure 19:
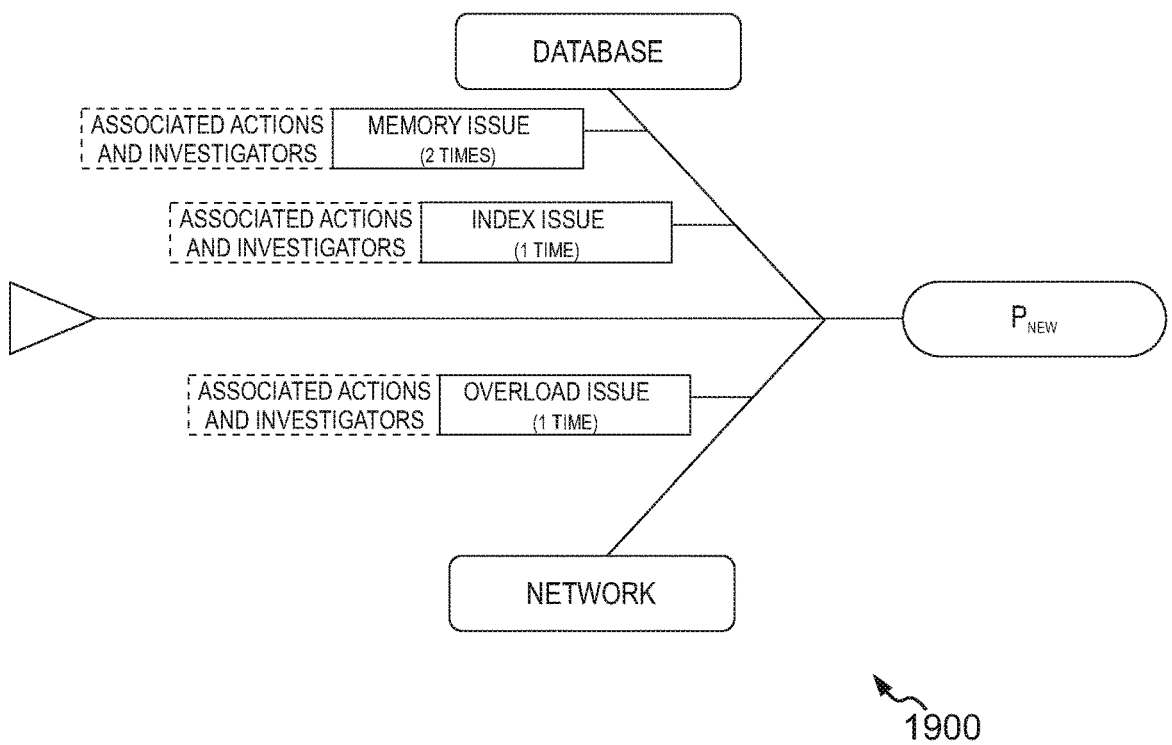
FIG. 19 is an example representation of a suggested cause-tree/fishbone diagram for the new problem, in accordance with an example embodiment.

Step 3: A cause tree/fishbone diagram that contains all the 'At Fault' (red) paths in $C_{new}$ is created which is the suggested cause tree/fishbone diagram. In the suggested cause tree/fishbone diagram, a head cause called Pnew is created. The potential causes in all the paths in $C_{new}$ are grouped level by level by their names. Further, for each level, all the unique grouped names are represented in the cause tree/fishbone diagram at their specific level under their respective parents. For example, Let $P_{new}$ be a new problem and let $M_1$, $M_2$, $M_3$ and $M_4$ be the four prior problems that match with $P_{new}$, computed using the similarity matching algorithm. Suppose that the cause-tree/fishbone diagram for the problem $M_1$ has an 'At Fault' (red) path of /database/memory issue, the cause-tree/fishbone diagram problem $M_2$ has an 'At Fault' (red) path of /network/overload, the problem $M_3$ has an 'At Fault' (red) path of /database/index issue and the problem $M_4$ has an 'At Fault' (red) path of /database/memory issue. Using the steps given above, the most likely cause for $P_{new}$ is /database/memory issue, with a frequency count of 2, and the suggested cause-tree/fishbone diagram consists of the causes /database/memory issue, /database/index issue and /network/overload with frequency count of 2, 1 and 1 respectively. When the paths are grouped level by level, one gets the cause-tree/fishbone diagram as shown in a representation 1900 of FIG. 19.

At operation 1706d, suggestions for actions to be performed for resolving the potential causes for the new problem $P_{new}$ are generated. For suggesting actions, all the actions in the cause-trees/fishbones diagram of the matching problems in the list $M_{new}$ to solve the problems are identified. Once the actions are identified, the actions are associated to the respective potential causes in the suggested cause-tree/fishbone diagram for the problem $P_{new}$. The actions here represent the suggested actions.

At operation 1706e, suggestions for investigators/personnel who can resolve the new problem $P_{new}$ are generated. For suggesting investigators, first the data of the cause-trees/fishbones of the matching problems in the list $M_{new}$ are examined to identify the users who took the actions to solve the problems. The information about the users is available in the audit trail maintained for the updates to the cause-trees/fishbones. The personnel are then associated to the respective potential causes in the suggested cause-tree/fishbone diagram for the problem $P_{new}$.

Figure 20:
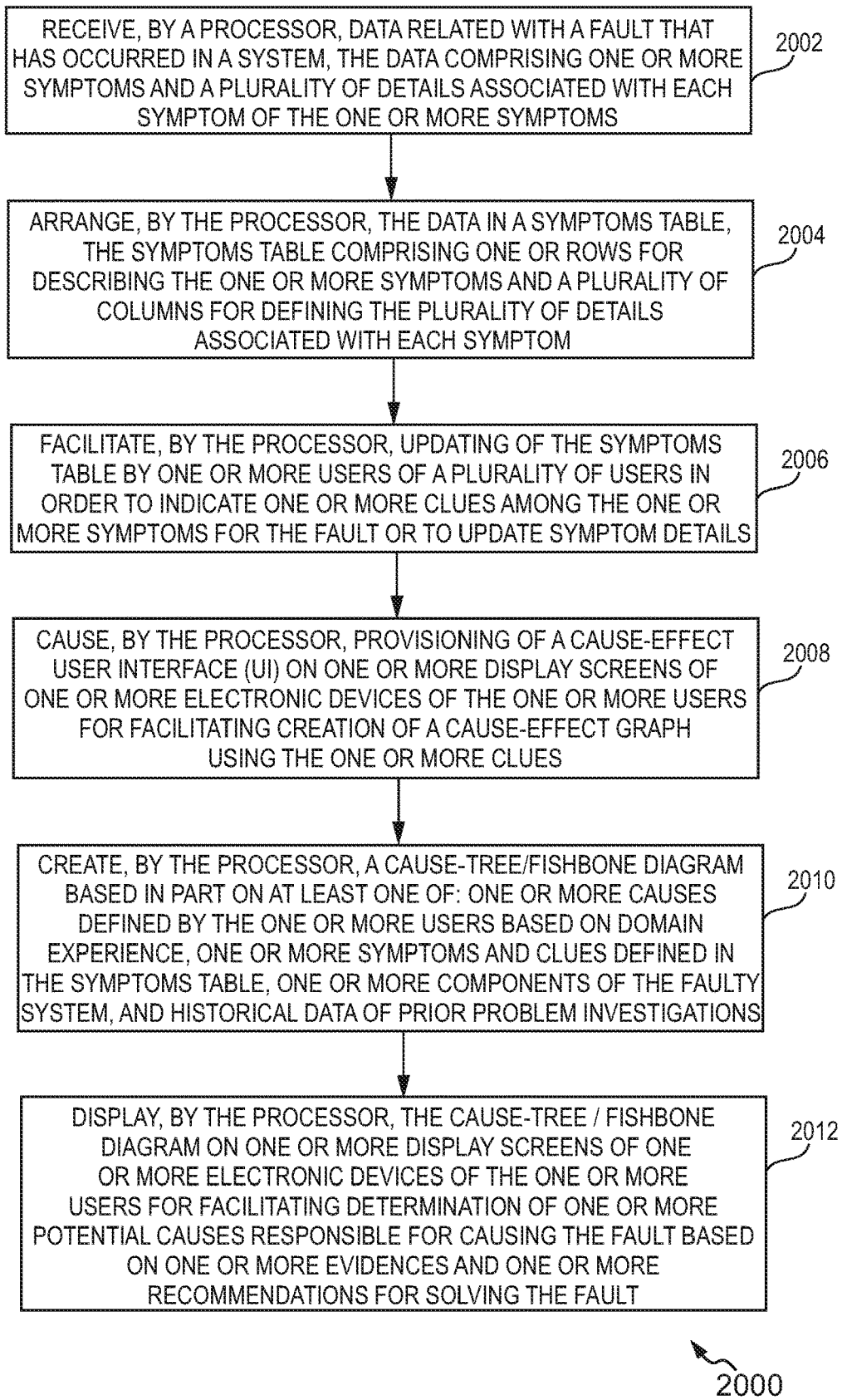
FIG. 20 is a flowchart illustrating a method for collaborative evidence-based problem investigation and resolution, in accordance with an example embodiment.

FIG. 20 is a flowchart illustrating a method 2000 for collaborative evidence-based problem investigation and resolution, in accordance with an example embodiment. The operations of the method 2000 may be carried out by a server such as the server 114, the system 200 or the electronic devices 108a to 108n. The sequence of operations of the method 2000 may not be necessarily executed in the same order as they are presented. Further, one or more operations may be grouped together and performed in form of a single step, or one operation may have several sub-steps that may be performed in parallel or in sequential manner.

At operation 2002, the method 2000 includes receiving, by a processor, data related with one or more faults that have occurred in a faulty system. The data related with the fault includes one or more symptoms and one or more details associated with each symptom of the one or more symptoms. The one or more details include, but are not limited to, symptom identifier, symptom patterns, times of symptom occurrences, notes, attachment, component and symptom category. In an embodiment, the data related to the fault is provided manually to the system 200. In another embodiment, the data related to the fault is automatically pulled in through APIs by connecting API's to monitoring tools of the faulty system which collects and continuously analyze the faulty system data.

At operation 2004, the method 2000 includes arranging, by the processor, the data in a symptoms table. The received data is arranged in the symptoms table which includes one or more rows for describing the one or more symptoms and a plurality of columns for defining one or more details associated with each symptom. The one or more symptoms define 'what', 'when' and 'where' aspects of the problem that have occurred in the faulty system. In an embodiment, the 'what' aspect defines symptoms due to which the problem is manifesting in the faulty system, the 'when' aspects define when the symptoms were observed and the 'where' aspect defines where the symptoms were observed. The one or more symptoms may indicate either presence or absence of errors.

At operation 2006, the method 2000 includes facilitating, by the processor, updating of the symptoms table by one or more users of a plurality of users in order to indicate one or more clues among the one or more symptoms for the fault or to update symptom details. The one or more clues are identified by the plurality of users by examining the one or more symptoms, and by gathering more evidence as required. In an embodiment, the clues are notable symptoms, i.e., ones that are significant in the process of failure analysis and decision-making by the users (e.g., the investigators). The clues defined in the symptoms table may be used by the users to either clear or implicate one or more potential causes for the problem.

At operation 2008, the method 2000 includes causing, by the processor, provisioning of a cause-effect user interface (UI) on one or more display screens of one or more electronic devices of the one or more users for facilitating creation of a cause-effect graph using the one or more clues. The cause-effect graph is used by the plurality of users to concurrently analyze the cause-effect relationships between the one or more clues. A 'how' aspect of the problem is defined using the cause-effect graph i.e. how the problem happened by determining the cause-effect relationships among the symptoms seen. In an embodiment, the one or more clues are pinned on the provided cause-effect user interface to create the cause-effect graph. In another embodiment, the one or more clues may be grouped together to indicate correlation of the one or more symptoms. The one or more clues or groups of clues are connected with causal arrows to show 'how' the events unfolded.

At operation 2010, the method 2000 includes creating, by the processor, a cause-tree/fishbone diagram based in part on at least one of: one or more causes defined by the one or more users based on domain experience, one or more symptoms and clues defined in the symptoms table, one or more components of the faulty system, and historical data of prior problem investigations. The cause-tree/fishbone diagram helps users in systematically exploring one or more potential causes behind the fault, and in coordinating with other investigators of the fault. A 'why' aspect of the problem i.e. why the problem happened is determined using the cause-tree/fishbone diagram.

At operation 2012, the method 2000 includes displaying, by the processor, the cause-tree/fishbone diagram on one or more display screens of the one or more electronic devices of the one or more users for facilitating determination of one or more potential causes responsible for causing the fault based on one or more evidences and one or more recommendations for resolving the fault. The displayed cause-tree/fishbone diagram includes a head representing the fault that has occurred in the faulty system, one or more bones that branch off the spine for major causes, with sub-branches for sub-causes, to as many levels as required, representing the one or more causes and their sub-causes for the fault and one or more attributes associated with each cause of the one or more causes for the fault. The cause-tree/fishbone diagram allows concurrent operations to be performed on the cause-tree/fishbone diagram by the plurality of users which helps in determining the contributing causes so that actions can be taken for recovery and repair.

Figure 21:
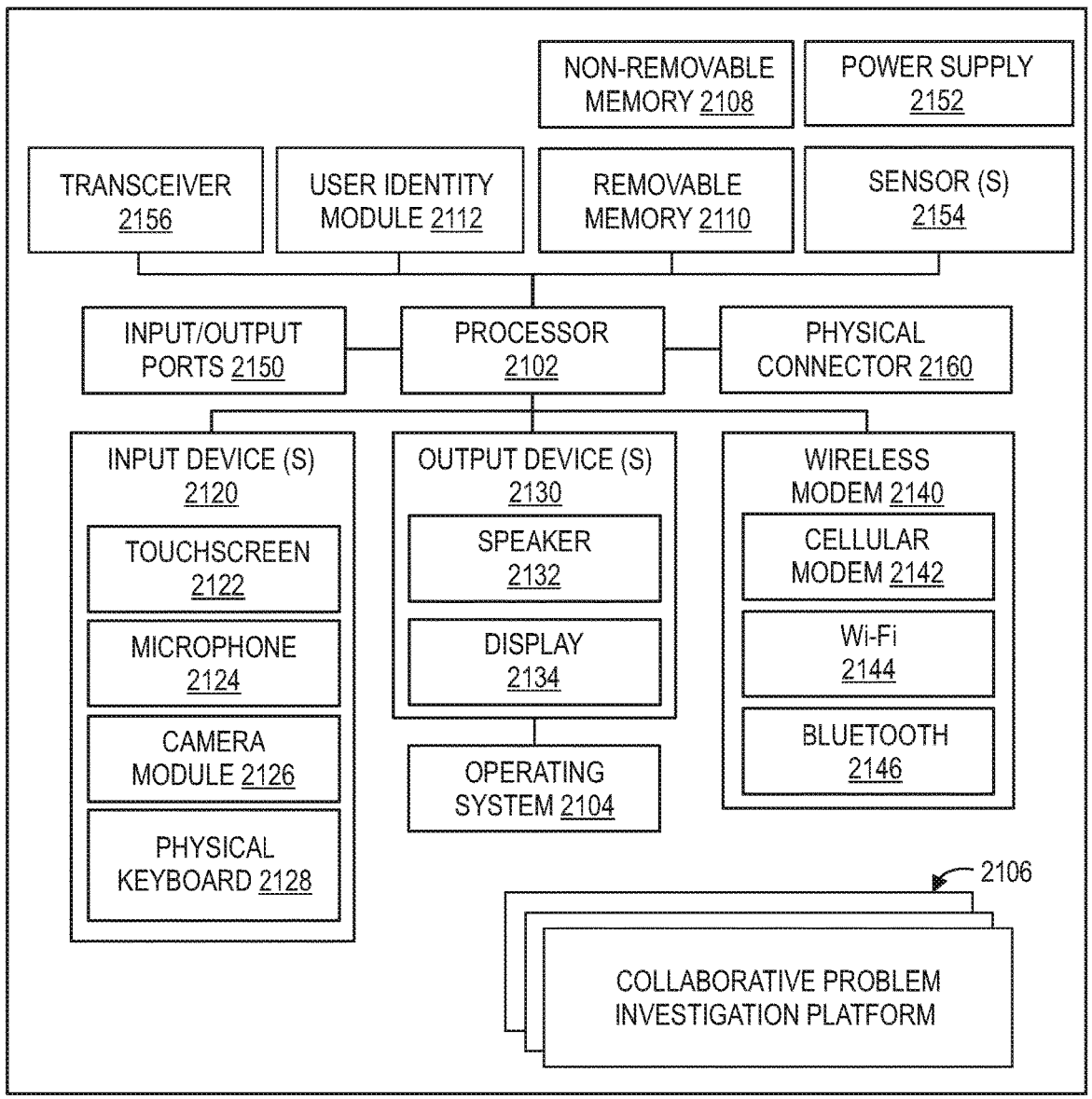
FIG. 21 is a block diagram of an electronic device capable of implementing the various embodiments of the present disclosure.

FIG. 21 shows a simplified block diagram of an electronic device 2100 capable of implementing the various embodiments of the present disclosure. The electronic device 2100 may be an example of the electronic devices 104a, 104b and 108. It should be understood that the electronic device 2100 as illustrated and hereinafter described is merely illustrative of one type of device and should not be taken to limit the scope of the embodiments. As such, it should be appreciated that at least some of the components described below in connection with the electronic device 2100 may be optional and thus in an example embodiment may include more, less or different components than those described in connection with the example embodiment of the FIG. 21. As such, among other examples, the electronic device 2100 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 2100 includes a controller or a processor 2102 (e.g., a signal processor, microprocessor, ASIC, or other control and processing logic circuitry) for performing such tasks as signal coding, data processing, image processing, input/output processing, power control, and/or other functions. An operating system 2104 controls the allocation and usage of the components of the electronic device 2100 and provides support for one or more applications programs, such as the collaborative problem investigation platform that implement one or more of the innovative features described herein. The applications 2106 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 2100 includes one or more memory components, for example, a non-removable memory 2108 and/or a removable memory 2110. The non-removable memory 2108 and/or the removable memory 2110 may be collectively known as database in an embodiment. The non-removable memory 2108 can include RAM, ROM, flash memory, a hard disk, or other well-known memory storage technologies. The removable memory 2110 can include flash memory, smart cards, or a Subscriber Identity Module (SIM). The one or more memory components can be used for storing data and/or code for running the operating system 2104. The electronic device 2100 may further include a user identity module (UIM) 2112. The UIM 2112 may be a memory device having a processor built in. The UIM 2112 may include, for example, a subscriber identity module (SIM), a universal integrated circuit card (UICC), a universal subscriber identity module (USIM), a removable user identity module (R-UIM), or any other smart card. The UIM 2112 typically stores information elements related to a mobile subscriber. The UIM 2112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 2100 can support one or more input devices 2120 and one or more output devices 2130. Examples of the input devices 2120 may include, but are not limited to, a touch screen/a display screen 2122 (e.g., capable of capturing finger tap inputs, finger gesture inputs, multi-finger tap inputs, multi-finger gesture inputs, or key-stroke inputs from a virtual keyboard or keypad), a microphone 2124 (e.g., capable of capturing voice input), a camera module 2126 (e.g., capable of capturing still picture images and/or video images) and a physical keyboard 2128. Examples of the output devices 2130 may include, but are not limited to a speaker 2132 and a display 2134. Other possible output devices can include piezoelectric or other haptic output devices. Some devices can serve more than one input/output function. For example, the touch screen 2122 and the display 2134 can be combined into a single input/output device.

A wireless modem 2140 can be coupled to one or more antennas (not shown in the FIG. 21) and can support two-way communications between the processor 2102 and external devices, as is well understood in the art. The wireless modem 2140 is shown generically and can include, for example, a cellular modem 2142 for communicating at long range with the mobile communication network, a Wi-Fi compatible modem 2144 for communicating at short range with an external Bluetooth-equipped device or a local wireless data network or router, and/or a Bluetooth-compatible modem 2146. The wireless modem 2140 is typically configured for communication with one or more cellular networks, such as a GSM network for data and voice communications within a single cellular network, between cellular networks, or between the electronic device 2100 and a public switched telephone network (PSTN).

The electronic device 2100 can further include one or more input/output ports 2150, a power supply 2152, one or more sensors 2154 for example, an accelerometer, a gyroscope, a compass, or an infrared proximity sensor for detecting the orientation or motion of the electronic device 2100, a transceiver 2156 (for wirelessly transmitting analog or digital signals) and/or a physical connector 2160, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 21, or one or more operations of the flowchart 1700 and the flowchart 2000 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 22 is a simplified block diagram of a server system 2200, in which the collaborative problem investigation platform 116 may be stored, in accordance with one embodiment of the present disclosure. The server system 200 is an example of the server 114 shown and explained with reference to FIG. 1. The server system 2200 includes a computer system 2205 and one or more databases, such as a database 2210.

The computer system 2205 includes a processor 2215 for executing instructions. Instructions may be stored in, for example, but not limited to, a memory 2220. The processor 2215 may include one or more processing units (e.g., in a multi-core configuration). The processor 2215 is operatively coupled to a communication interface 2225 such that the computer system 2205 is capable of communicating with a remote device such as an electronic device 2235. Example of the electronic device 2235 may include, but is not limited to the electronic devices 104a, 104b and 108 shown in FIG. 1.

The processor 2215 may also be operatively coupled to the database 2210. The database 2210 is configured to store the data related with all the problems that are investigated and solved using the collaborative problem investigation platform 116 supported by the server system 2200 as explained with reference to FIGS. 1 to 21. The database 2210 may also be configured to store concurrency rules and concurrency control models for each of the symptoms table, the cause-effect graph and the cause-tree/fishbone diagram, and the fault status values and their precedence rules for propagation. The database 2210 is any computer-operated hardware suitable for storing and/or retrieving data. The database 2210 may include multiple storage units such as hard disks and/or solid-state disks in a redundant array of inexpensive disks (RAID) configuration. The database 2210 may include, but not limited to, a storage area network (SAN) and/or a network attached storage (NAS) system.

In some embodiments, the database 2210 is integrated within the computer system 2205. For example, the computer system 2205 may include one or more hard disk drives as the database 2210. In other embodiments, the database 2210 is external to the computer system 2205 and may be accessed by the computer system 2205 using a storage interface 2230. The storage interface 2230 is any component capable of providing the processor 2215 with access to the database 2210. The storage interface 2230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 2215 with access to the database 2210.

The memory 2220 is a storage device embodied as one or more volatile memory devices, one or more non-volatile memory devices, and/or a combination of one or more volatile memory devices and non-volatile memory devices, for storing micro-contents information and instructions. The memory 2220 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for collaborative evidence-based problem investigation and resolution. The system helps in bringing all investigative data related to a problem at one place, providing a 360° view of the problem that reduces collaboration and difficult coordination among members of large distributed teams working on complex cross-functional problems. The system provides a clear and comprehensive visual representation of the problem, thereby significantly reducing the burden of reading/writing about the details in a natural language while enabling efficient in-context collaboration. Further, the system learns from user actions and generates prescriptive recommendations for similar problems in the future, thereby ensuring efficient reuse of knowledge as compared to writing and reading knowledge articles which need to be understood and applied at the proper time.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and\or implementation without departing from the spirit or scope of the claims.

What is claimed is:

1. A method for collaborative evidence-based problem investigation and resolution, comprising:
    receiving, by a processor, data relevant for investigation of a fault that has occurred in a faulty system, the data comprising one or more symptoms that are relevant to the occurrence of the problem and one or more details associated with each symptom of the one or more symptoms, and wherein the faulty system includes a software system or a non-software system;
    arranging, by the processor, the data in a symptoms table as a concurrently updatable tabular format, the symptoms table comprising one or more rows for describing the one or more symptoms and a plurality of columns for defining the one or more details associated with each symptom;
    facilitating, by the processor, concurrent updating of the symptoms table as per the concurrency control model provided for the symptoms table by one or more users of a plurality of users in order to indicate one or more clues among the one or more symptoms for the fault or to update symptom details;
    causing, by the processor, provisioning of a cause-effect user interface (UI) on one or more display screens of one or more electronic devices of the one or more users for facilitating creation of a cause-effect graph using the one or more clues marked in the symptoms table;
    creating, by the processor, a cause-tree/fishbone diagram with automatic nesting and un-nesting of the cause-tree/fishbone diagram whenever a cause is added to or deleted from a cause hierarchy based in part on at least one of: one or more causes defined by the one or more users based on domain experience; the one or more symptoms and clues defined in the symptoms table; one or more components of the faulty system; and historical data of prior problem investigations;
    displaying, by the processor, the cause-tree/fishbone diagram representing the hierarchy of potential causes on the one or more display screens of the one or more electronic devices of the one or more users for facilitating determination of one or more potential causes responsible for causing the fault based on one or more symptoms, one or more recommendations for resolving the fault and an action list associated to the cause of the plurality of potential causes, wherein the action list includes one or more actions determined during the investigation; and
    resolving, by the processor, at least one fault in response to one or more actions selected by the user, wherein the actions include but not limited to: upgrade memory, reboot server, restart application, and reboot storage.

2. The method as claimed in claim 1, wherein the one or more details associated with each symptom comprises at least one of:
    symptom identifier; symptom patterns;
    times of symptom occurrences;
    notes;
    attachments; component; and symptom category.

3. The method as claimed in claim 1, wherein the cause-effect graph comprises one or more nodes that correspond to the one or more clues associated with the fault and one or more directed arrows for connecting the one or more nodes for indicating a cause-effect relationship between the one or more clues.

4. The method as claimed in claim 3, further comprising:
    facilitating, by the processor, concurrent updating of the cause-effect graph by at least two users of the plurality of users through a concurrency control model for the cause-effect graph to generate an updated cause-effect graph, the updated cause-effect graph comprising an updated cause-effect relationship between the one or more clues; and
    displaying, by the processor, the updated cause-effect graph on at least some of the one or more display screens of the one or more electronic devices of the one or more users.

5. The method as claimed in claim 1, further comprising:
    facilitating, by the processor, concurrent operations on the one or more rows and the plurality of columns of the symptoms table by at least two users of the plurality of users through a concurrency control model for symptoms table;
    merging, by the processor, results of the concurrent operations performed on the symptoms table to form an updated symptoms table; and
    displaying, by the processor, the updated symptoms table to at least some of the one or more display screens of the one or more electronic devices of the one or more users.

6. The method as claimed in claim 5, wherein the concurrent operations comprises at least one of:

deletion of at least one of the one or more symptoms in the symptoms table;

addition, deletion or updating of symptom identifier for a symptom in the symptoms table;

addition, deletion or updating of symptom patterns for a symptom in the symptoms table;

addition, deletion or updating of times of symptom occurrences for a symptom in the symptoms table;

addition, deletion or updating of component for a symptom in the symptoms table;

addition, deletion or updating of symptom category for a symptom in the symptoms table;

addition, deletion or updating of a note to a symptom in the symptoms table;

addition, deletion, or updating of an attachment to a symptom in the symptoms table;

marking of at least one of the one or more clues in the symptoms table; and unmarking of at least one of the one or more clues in the symptoms table.

7. The method as claimed in claim 1, wherein the cause-tree/fishbone diagram comprises:

a head representing the fault that has occurred in the faulty system;

one or more bones that branch off a spine for major causes, with sub-branches for sub-causes, to as many levels as required, representing the one or more potential causes and their sub-causes for the fault; and one or more attributes associated with each cause of the one or more causes for the fault.

8. The method as claimed in claim 7, wherein the one or more attributes comprises at least one of:

name;
category;
deadline;
fault status;
priority;
notes;
attachments;
actions;
assigned-to; and
pinned symptoms.

9. The method as claimed in claim 8, wherein the fault status of the cause comprises a fault status value, wherein the fault status value comprises a fault status weight, wherein the fault status value and the associated fault status weight are one of: 'not relevant' and '0'; 'likely not relevant' and '1'; 'not at fault' and '2'; 'likely not at fault' and '3'; 'unknown' and '4'; 'likely at fault' and '5'; 'likely at fault' and '6'; and 'at fault' and '7'.

10. The method as claimed in claim 9, further comprising:

facilitating, by the processor, automatic fault status value propagation to maintain fault status consistency in the cause-tree/fishbone diagram based on a predefined precedence rule.

11. The method as claimed in claim 8, further comprising:

facilitating, by the processor, simultaneous updating of the one or more causes and the one or more attributes associated with each cause of the one or more causes in the cause-tree/fishbone diagram by at least two users of the plurality of users through a concurrency control model for cause-tree/fishbone diagram;

recording, by the processor, one or more updates caused by the plurality of users on the cause-tree/fishbone diagram in an audit trail maintained for the fault; and using, by the processor, the audit trail maintained for the fault for generating prescriptive recommendations for a new fault upon determining a similarity between the fault and the new fault, the recommendations comprising one or more likely clues and their cause-effect relationships for the new fault, one or more users who were previously involved in finding solutions for the fault and one or more potential causes and potential solutions for resolving the new fault.

12. The method as claimed in claim 11, wherein the similarity between the fault and the new fault is determined by computing a similarity score based on comparison of the one or more symptoms of the fault and the new fault.

13. A server system for collaborative evidence-based problem investigation and resolution, comprising:

a memory configured to store instructions; and a processor configured to execute the instructions stored in the memory and thereby cause the server system to perform:

receiving data relevant for investigation of a fault that has occurred in a faulty system, the data comprising one or more symptoms that are relevant to the occurrence of the problem and one or more details associated with each symptom of the one or more symptoms, and wherein the faulty system includes a software system or a non-software system;

arranging the data in a symptoms table as a concurrently updatable tabular format, the symptoms table comprising one or more rows for describing the one or more symptoms and a plurality of columns for defining the one or more details associated with each symptom;

facilitating concurrent updating of the symptoms table as per the concurrency control model provided for the symptoms table by one or more users of a plurality of users in order to indicate one or more clues among the one or more symptoms for the fault or update symptom details;

causing provisioning of a cause-effect user interface (UI) on one or more display screens of one or more electronic devices of the one or more users for facilitating creation of a cause-effect graph using the one or more clues marked in the symptoms table;

creating a cause-tree/fishbone diagram with automatic nesting and un-nesting of the cause-tree/fishbone diagram whenever a cause is added to or deleted from a cause hierarchy based in part on at least one of: one or more causes defined by the one or more users based on domain experience; the one or more symptoms and clues defined in the symptoms table; one or more components of the faulty system; and historical data of prior problem investigations; and displaying the cause-tree/fishbone diagram representing the hierarchy of potential causes on the one or more display screens of the one or more electronic devices of the one or more users for facilitating determination of one or more potential causes responsible for causing the fault based on one or more symptoms, one or more recommendations for resolving the fault and an action list associated to the cause of the plurality of potential causes, wherein the action list includes one or more actions determined during the investigation; and resolving, by the processor, at least one fault in response to one or more actions selected by the user, wherein the actions include but not limited to: upgrade memory, reboot server, restart application, and reboot storage.

14. The server system as claimed in claim 13, wherein the one or more details associated with each symptom comprises at least one of:
symptom identifier; symptom patterns;
times of symptom occurrences; notes;
attachments;
component; and
symptom category.

15. The server system as claimed in claim 13, wherein the cause-effect graph comprises one or more nodes that correspond to the one or more clues associated with the fault and one or more directed arrows for connecting the one or more nodes for indicating a cause-effect relationship between the one or more clues.

16. The server system as claimed in claim 15, wherein the server system is configured to:
facilitate concurrent updating of the cause-effect graph by at least two users of the plurality of users through a concurrency control model for the cause-effect graph to generate an updated cause-effect graph, the updated cause-effect graph comprising an updated cause-effect relationship between the one or more clues; and
display the updated cause-effect graph on at least some of the one or more display screens of the one or more electronic devices of the one or more users.

17. The server system as claimed in claim 13, wherein the server system is further configured to:
facilitate concurrent operations on the one or more rows and the plurality of columns of
the symptoms table by at least two users of the plurality of users through a concurrency control model for symptoms table;
merge results of the concurrent operations performed on the symptoms table to form an updated symptoms table; and
display the updated symptoms table to at least some of the one or more display screens of the one or more electronic devices of the one or more users.

18. The server system as claimed in claim 17, wherein the concurrent operations comprises at least one of:
addition of one or more new symptoms to the symptoms table;
deletion of at least one of the one or more symptoms in the symptoms table;
addition, deletion or updating of symptom identifier for a symptom in the symptoms table;
addition, deletion or updating of symptom patterns for a symptom in the symptoms table;
addition, deletion or updating of times of symptom occurrences for a symptom in the symptoms table;
addition, deletion or updating of symptom component for a symptom in the symptoms table;
addition, deletion or updating of symptom category for a symptom in the symptoms table;
addition, deletion, or updating of a note to a symptom in the symptoms table;
addition, deletion, or updating of an attachment to a symptom in the symptoms table;
marking of at least one of the one or more clues in the symptoms table; and
unmarking of at least one of the one or more clues in the symptoms table.

19. The server system as claimed in claim 13, wherein the cause-tree/fishbone diagram comprises:
a head representing the fault that has occurred in the faulty system;
one or more bones that branch off the spine for major causes, with sub-branches for sub-causes, to as many levels as required, representing the one or more potential causes and sub-causes for the fault; and
one or more attributes associated with each cause of the one or more causes for the fault.

20. The server system as claimed in claim 19, wherein the one or more attributes comprises at least one of:
name; category; deadline; fault status; priority; notes; attachments;
actions;
assigned-to; and
pinned symptoms.

21. The server system as claimed in claim 20, wherein the fault status of the cause comprises a fault status value, wherein the fault status value comprises a fault status weight, wherein the fault status value and the associated fault status weight are one of: 'not relevant' and '0'; 'likely not relevant' and '1'; 'not at fault' and '2'; 'likely not at fault' and '3'; 'unknown' and '4'; 'likely at fault' and '5'; 'likely at fault' and '6'; and 'at fault' and '7'.

22. The server system as claimed in claim 21, wherein the server system is further configured to:
facilitate automatic fault status value propagation to maintain fault status consistency in the cause-tree/fishbone diagram based on a predefined precedence rule.

23. The server system as claimed in claim 20, wherein the server system is further configured to:
facilitate simultaneous updating of the one or more causes and the one or more attributes associated with each cause of the one or more causes in the cause tree/fishbone diagram by at least two users of the plurality of users through a concurrency control model for cause-tree/fishbone diagram;
record one or more updates caused by the plurality of users on the cause tree/fishbone diagram in an audit trail maintained for the fault; and
use the audit trail maintained for the fault for generating prescriptive recommendations for a new fault upon determining a similarity between the fault and the new fault, the recommendations comprising one or more likely clues and their cause-effect relationships for the new fault, one or more users who were previously involved in finding solutions for the fault and one or more potential causes and potential solutions for resolving the new fault.

24. The server system as claimed in claim 23, wherein the similarity between the fault and the new fault is determined by computing a similarity score based on comparison of the one or more symptoms of the fault and the new fault.

25. A system for collaborative evidence-based problem investigation and resolution comprising:
a database configured to store data related with one or more faults occurred in a faulty system that are investigated and solved using the system, wherein the faulty system includes a software system or a non-software system;
a user interface (UI) module in communication with the database, the UI module is configured to present one or more UIs for facilitating collaborative evidence based problem investigation and resolution to receive data associated with the problem, display a cause-effect user interface (UI) for facilitating creation of a cause-effect graph and display a cause-tree/fishbone diagram associated with the problem for facilitating collaborative evidence-based cause analysis of the problem;

a fault data receiving module in communication with the UI module and the database, the fault data receiving module is configured to receive data relevant for investigation of a fault that has occurred in a faulty system, the data includes monitoring data, log event data, system alerts and anomalies occurring in the faulty system;

a fault analysis module in communication with the database, the UI module and the fault data receiving module, the fault analysis module is configured to facilitate fault analysis and tracking of status and progress of the investigation and create a symptoms table, the cause-effect graph and the cause-tree/fishbone diagram;

a reporting module in communication with the database, the UI module and the fault analysis module, the reporting module is configured to facilitate generation of status reports and tracking of key performance indicators for problem investigations and configured to prepare the investigation status reports based on the updates done on the symptoms table, the cause-effect graph and the cause-tree/fishbone diagram; and a recommendation engine in communication with the database, the recommendation engine is configured to make prescriptive recommendations for a new fault using the historical data related with one or more resolved faults stored in the database, the prescriptive recommendations comprising one or more likely clues and their cause-effect relationships for the new fault, one or more users who are qualified to find solutions for the new fault and one or more potential causes or potential solutions for resolving the new fault and an action list associated to the cause of the plurality of potential causes, wherein the action list includes one or more actions determined during the investigations, wherein the recommendation engine is further configured to self-learn from the actions facilitated by the fault analysis module and resolving, at least one fault in response to one or more actions selected by the user from the action list, wherein the actions include but not limited to: upgrade memory, reboot server, restart application, and reboot storage.

26. The system as claimed in claim 25, wherein the fault analysis module comprises:

a symptom table creation and managing unit to create the symptoms table associated with a problem by arranging the data relevant for investigation of the fault in the symptoms table and to facilitate concurrent updating of the symptoms table;

a cause-effect graph creation and managing unit in communication with the symptom table creation and managing unit to facilitate creation of the cause effect graph by the one or more users using one or more clues marked in the symptoms table; and a cause-tree/fishbone diagram creation and management unit in communication with the symptom table creation and managing unit and the cause-effect graph creation and managing unit to create the cause-tree/fishbone diagram with automatic nesting and un-nesting of the cause-tree/fishbone diagram whenever a cause is added to or deleted from a cause hierarchy based in part on at least one of: one or more causes defined by the one or more users based on domain experience; the one or more symptoms and clues defined in the symptoms table; one or more components of the faulty system; and historical of data of prior problem investigations in order to facilitate collaborative evidence-based cause analysis of the problem that has occurred in the faulty system.

27. The system as claimed in claim 26, wherein the reporting module comprises:

a status report generation and sharing unit in communication with the database, the UI module and the fault analysis module to prepare and share investigation status reports based on updates done on the symptoms table, the cause-effect graph and the cause-tree/fishbone diagram; and a performance tracking unit in communication with the database, the UI module and the fault analysis module to track individual and aggregate key performance indicators for the problem investigations.

\* \* \* \* \*